US010164448B2

(12) United States Patent
Tanaka et al.

(10) Patent No.: US 10,164,448 B2
(45) Date of Patent: Dec. 25, 2018

(54) POWER CONVERSION SYSTEM

(71) Applicant: Mitsubishi Electric Corporation, Chiyoda-ku (JP)

(72) Inventors: Kazufumi Tanaka, Chiyoda-ku (JP); Sadayuki Inoue, Chiyoda-ku (JP); Makiko Kise, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 19 days.

(21) Appl. No.: 15/543,611

(22) PCT Filed: Sep. 29, 2015

(86) PCT No.: PCT/JP2015/077495
§ 371 (c)(1),
(2) Date: Jul. 14, 2017

(87) PCT Pub. No.: WO2016/132586
PCT Pub. Date: Aug. 25, 2016

(65) Prior Publication Data
US 2017/0366023 A1     Dec. 21, 2017

(30) Foreign Application Priority Data

Feb. 17, 2015    (JP) .............................. 2015-028259

(51) Int. Cl.
*H02J 7/00*    (2006.01)
*H02J 7/35*    (2006.01)
(Continued)

(52) U.S. Cl.
CPC ......... *H02J 7/0026* (2013.01); *H01M 10/425* (2013.01); *H01M 10/443* (2013.01);
(Continued)

(58) Field of Classification Search
CPC ........ H02J 7/0026; H02J 7/047; H02J 7/0083; H02J 7/0022; H02J 3/385; H02J 7/045;
(Continued)

(56) References Cited

U.S. PATENT DOCUMENTS 7,023,771 B2 * 4/2006 Takata ................. G11B 7/1263
369/47.32
7,536,229 B2 * 5/2009 Ichikawa .............. G06F 9/5088
700/100
2013/0285613 A1   10/2013 Fujita et al.

FOREIGN PATENT DOCUMENTS

| JP | 2013-085386 A | 5/2013 |
| JP | 5385698 B2 | 1/2014 |
| WO | 2012/098794 A1 | 7/2012 |

OTHER PUBLICATIONS

International Search Report dated Dec. 15, 2015 in PCT/JP2015/077495, filed on Sep. 29, 2015.

* cited by examiner

*Primary Examiner* — M Baye Diao
(74) *Attorney, Agent, or Firm* — Oblon, McClelland, Maier & Neustadt, L.L.P.

(57) ABSTRACT

When a plurality of storage batteries is used by connecting them in parallel, since the progress of degradation differs among the storage batteries, a power conversion system includes a degradation information acquisition device for acquiring the degradation information of the storage batteries, a temperature information acquisition device for detecting the temperature information of the storage batteries, and a control device for controlling the storage battery power converter based on the degradation information of the storage batteries by the degradation information acquisition device and the temperature information of the storage batteries by the temperature information acquisition device so
(Continued)

that the degradation states of the plurality of the storage batteries can be matched.

13 Claims, 13 Drawing Sheets

(51) Int. Cl.
*H01M 10/42* (2006.01)
*H01M 10/44* (2006.01)
*H01M 10/48* (2006.01)
*H02J 3/38* (2006.01)
*H02J 7/04* (2006.01)
*H02J 3/32* (2006.01)

(52) U.S. Cl.
CPC ........... *H01M 10/486* (2013.01); *H02J 3/385* (2013.01); *H02J 7/0022* (2013.01); *H02J 7/0083* (2013.01); *H02J 7/0091* (2013.01); *H02J 7/045* (2013.01); *H02J 7/047* (2013.01); *H02J 7/35* (2013.01); *H02J 3/32* (2013.01); *H02J 2003/388* (2013.01)

(58) Field of Classification Search
CPC ...... H02J 7/0091; H02J 7/35; H02J 2003/388; H02J 3/32; H01M 10/486; H01M 10/443; H01M 10/425
USPC ......................................................... 320/134
See application file for complete search history.

POWER CONVERSION SYSTEM

TECHNICAL FIELD

The present invention relates to a power conversion system to which a plurality of storage batteries is connected in parallel and which supplies the power of the storage batteries to a load.

BACKGROUND ART

In a system to which a plurality of power supply devices having a plurality of storage batteries are connected in parallel and which supplies power to a load, a major problem is that the plurality of storage batteries are degraded. The storage batteries are degraded with use history and the amount of energy that can be stored is reduced. Therefore, there is proposed a technique for suppressing the degradation of the plurality of storage batteries by controlling the amount of energy supplied from the storage batteries (that is, the amount of power supplied from the plurality of power supply devices to a load) for each of the storage batteries when the plurality of power supply devices having storage batteries are connected in parallel and power is supplied to a load (for example, PTL 1).

CITATION LIST

Patent Literature

PTL 1: Japanese Patent No. 5385698

SUMMARY OF INVENTION

Technical Problem

The conventional power conversion system proposed has the effect of suppressing the progress of degradation of a storage battery (the degradation of a storage battery represents reduction in the capacity retention ratio below) due to preservation degradation by preferentially using the storage battery having a large remaining amount based on the detection result by a remaining amount detection device for detecting the remaining amount of each of the plurality of storage batteries. However, since the priority for using the storage batteries is determined based on only the remaining amounts of the storage batteries, the progress rate (referred to below as the progress or degradation) of degradation differs between the storage batteries. For example, when three storage batteries are installed and a total of 6 kW (2 kW for each storage battery) of power is supplied from the storage batteries, if one storage battery becomes suddenly unavailable because the storage battery has been degraded the power that can be output from the system is reduced to 4 kW and the assumed power cannot be supplied. Particularly in a system for starting an elevator in an apartment during a power interruption, if the maximum rated power cannot be supplied, the elevator cannot be operated or another problem occurs. In addition, when the progress of degradation of a plurality of storage batteries differs, the replacement times of the storage batteries differ, thereby reducing maintainability.

The progress of degradation of a storage battery depends on installation conditions of the storage battery, manufacturing variations of the storage battery, and the like. For example, when three storage batteries are installed as described above and one of the three storage batteries is installed at a position exposed to the afternoon sun, the temperature in the cabinet of the storage battery exposed to the afternoon sun rises as compared with the other storage batteries. When lithium-ion batteries are used as the storage batteries, if the temperatures of the storage batteries exceed 35° C., the progress of degradation is accelerated. When there are storage batteries having different progress of degradation caused by installation conditions and the like, the replacement times of the storage batteries differ and the maintainability is reduced.

Accordingly, an object of the invention is to provide a power conversion system capable of making control so as to match the states of degradation of a plurality of storage batteries as an input power supply.

Solution to Problem

A power conversion system according to the invention focuses on the progress of degradation and temperature state of a plurality of storage batteries functioning as input power supplies, the power conversion system including a plurality of storage battery power converters provided for each of a plurality of storage batteries used as input power supplies, the storage battery power converters operating the storage batteries in parallel, a degradation information acquisition device that acquires degradation information of the storage batteries, a temperature information acquisition device that detects temperature information of the storage batteries, and a control device that controls the storage battery power converters based on the degradation information of the storage batteries by the degradation information acquisition device and the temperature information of the storage batteries by the temperature information acquisition device, in which, based on progress of degradation of the storage batteries acquired by the degradation information acquisition device, the control device controls charge and discharge of the storage batteries by performing an operation for making a usable temperature range of a storage battery of the storage batteries that has been more degraded equal to or smaller than the usable temperature range of a storage battery of the storage batteries that has been less degraded and at least one of an operation for making a maximum charge and discharge current with respect to a storage battery temperature of the storage battery having been more degraded equal to or smaller than the maximum charge and discharge current of the storage battery having been less degraded and an operation for making a usable voltage range with respect to the storage battery temperature of the storage battery having been more degraded equal to or smaller than the usable voltage range of the storage battery having been less degraded.

Advantageous Effects of Invention

According to the invention, by detecting the storage battery having been more degraded using the degradation information acquisition device and making control having high degradation suppressing effects, the progress of degradation of the storage batteries can be matched. Accordingly, even when there are variations in the amount of power supplied by the storage batteries or there are variations in the progress of degradation of the storage batteries due to installation conditions or the like, the replacement times of the storage batteries can be adjusted by controlling the progress of degradation and all storage batteries can be replaced substantially at the same time.

DESCRIPTION OF EMBODIMENTS

Embodiment 1

Figure 1:
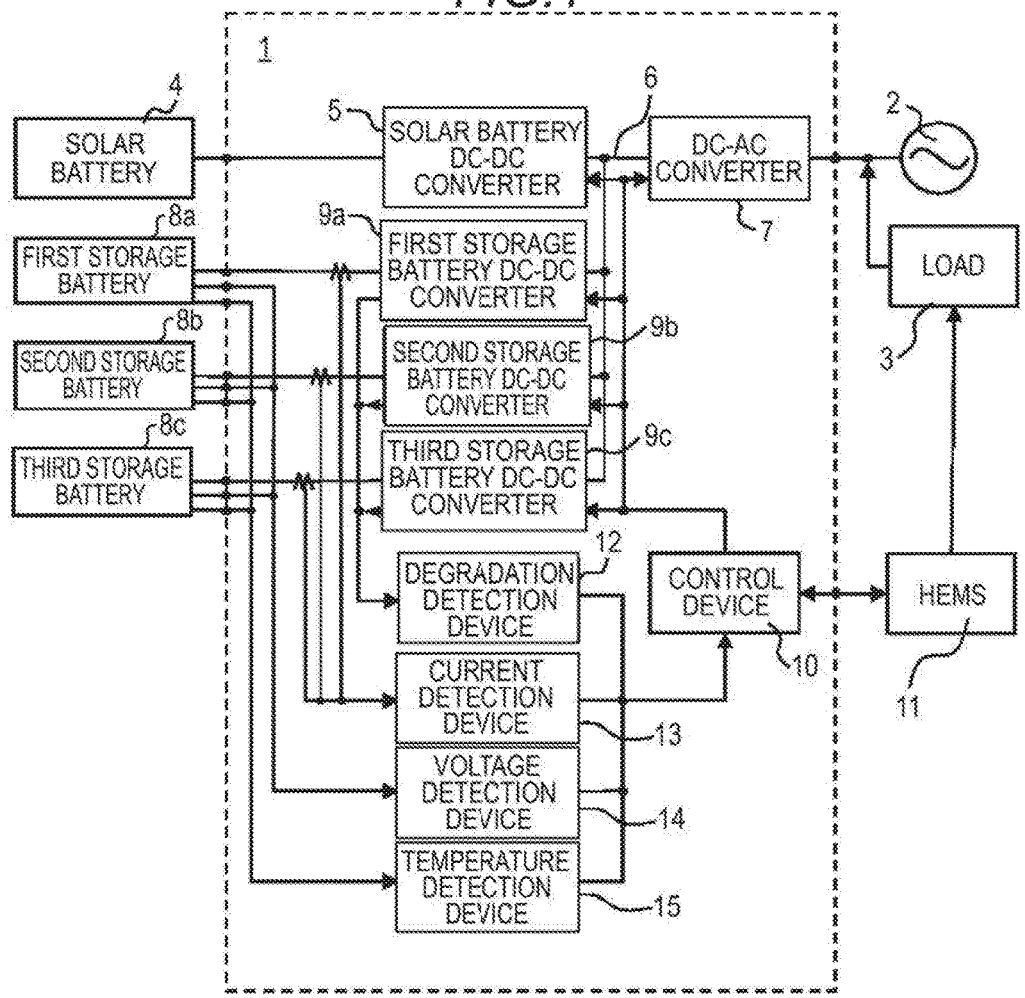
FIG. 1 is the first structural block diagram illustrating a power conversion system according to embodiment 1 of the invention.

FIG. 1 is the first structural block diagram illustrating the power conversion system according to embodiment 1 of the invention.

As illustrated in the drawing, a power conversion system 1 is connected to a load 3 such as a refrigerator, a light fixture, or a television set together with an electric power system 2 such as another AC power supply and supplies power to the load 3.

As power supply devices for the power conversion system 1, a device including a solar battery 4 as a power supply, a device including a first storage battery 8a as a power supply, a device including a second storage battery 8b as a power supply, and a device including a third storage battery 8c as a power supply are connected in parallel. The outputs of the solar battery 4, the first storage battery 8a, the second storage battery 8b, and the third storage battery 8c are connected to a solar battery DC-DC converter 5, a first storage battery DC-DC converter 9a, a second storage battery DC-DC converter 9b, and a third storage battery DC-DC converter 9c are connected, respectively. The outputs of the solar battery DC-DC converter 5, the first storage battery DC-DC converter 9a, the second storage battery DC-DC converter 9b, and the third storage battery DC-DC converter 9c are collectively connected to a DC-AC converter 7 via a DC bus line 6. Although three storage batteries including the first storage battery 8a, the second storage battery 8b, and the third storage battery 8c in addition to the solar battery 4 are connected in parallel in embodiment 1, a similar situation arises when two or more storage batteries are connected. The output of the DC-AC converter 7 is the output of the power conversion system 1.

The solar battery DC-DC converter 5 is driven and controlled by a control device 10 and controls the DC power from the solar battery 4. The first storage battery DC-DC converter 9a, the second storage battery DC-DC converter 9b, and the third storage battery DC-DC converter 9c are driven and controlled by the control device 10 and controls the charge and discharge of the corresponding first storage battery 8a, second storage battery 8b, and third storage battery 8c. In addition, the DC-AC converter 7 is driven and controlled by the control device 10, coverts a DC voltage to a desired AC voltage, and supplies the AC voltage to the electric power system 2 and the load 3. In addition, the DC-AC converter 7 can also convert the AC power supplied from the electric power system 2 to DC power and charge the first storage battery 8a with the DC power via the first storage battery DC-DC converter 9a or charge the second storage battery 8b and the third storage battery 8c similarly.

It should be noted that the control device 10 has communication means for communicating with the outside and a HEMS (Home Energy Management System) 11 is connected to the communication means of the control device 10. This HEMS 11 is operation plan creation means that creates the entire operation plan concerning the power conversion system 1 based on the state of the electric power system 2, the power consumption of the load 3, the amount of generated potter by the solar battery 4, the remaining amounts of the first storage battery 8a, the second storage battery 8b, and the third storage battery 8c, and the like, and the control device 10 controls the converters (the solar battery DC-DC converter 5, the first storage battery DC-DC converter 9a, the second storage battery DC-DC converter 9b, the third storage battery DC-DC converter 9c, and the DC-AC converter 7) based on the operation plan created by the HEMS 11.

In this control, based on the progress of degradation of the first storage battery 8a, the second storage battery 8b, and the third storage battery 8c detected by a degradation detection device 12, the control device 10 narrows the usable temperature ranges of the first storage battery 8a, the second storage battery 8b, and the third storage battery 8c, updates at least one of the maximum charge and discharge current and the usable voltage range at predetermined intervals, and controls the first storage battery DC-DC converter 9a, the second storage battery DC-DC converter 9b, and the third storage battery DC-DC converter 9c so that limitations of the maximum charge and discharge currents, the usable voltage ranges, and the usable temperature ranges of the first storage battery 8a, the second storage battery 8b, and the third storage battery 8c are not exceeded with reference to the detection results by a current detection device 13 for detecting the charge and discharge currents of the first storage battery 8a, the second storage battery 8b, and the third storage battery 8c, a voltage detection device 14 for detecting the voltages of the first storage battery 8a, the second storage battery 8b, and the third storage battery 8c, and a temperature detection device 15 for detecting the temperatures of the first storage battery 8a, the second storage battery 8b, and the third storage battery 8c.

That is, the degradation detection device 12 is configured to output the information of progress of degradation of the first storage battery 8a, the second storage battery 8b, and the third storage battery 8c as a degradation information acquisition device. In addition, the temperature detection device 15 is configured to output the information of the temperature state of the first storage battery 8a, the second storage battery 8b, and the third storage battery 8c as a temperature information acquisition device and to cause the current detection device 13 and the voltage detection device 14 to output the information of the operating states of the first storage battery 8a, the second storage battery 8b, and the third storage battery 8c in the temperature state.

The control device 10 controls the solar battery DC-DC converter 5 by making switching between maximum power point tracking control (referred to below as MPPT control) for obtaining the maximum power of the solar battery 4 and voltage control for controlling the output power of the solar battery 4 by controlling the output voltage of the solar battery 4 according to the situation. MPPT control and voltage control will be described briefly below with reference to FIG. 2.

Figure 2:
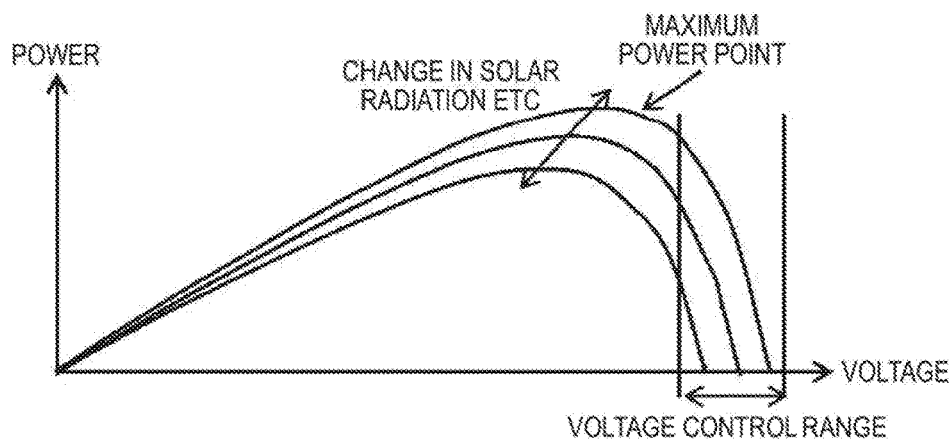
FIG. 2 illustrates an example of the power-voltage characteristics of a solar battery according to embodiment 1 of the invention.

FIG. 2 illustrates an example of the power-voltage characteristics of the solar battery 4. The horizontal axis represents the voltage value of the solar battery 4 and the vertical axis represents the value of generated power by the solar battery 4. The power-voltage characteristics are illustrated for three cases in which the amount of solar radiation and the temperature of the solar battery 4 are different.

First, general MPPT control will be described.

As illustrated in FIG. 2, the power-voltage characteristics of the solar battery 4 changes depending on ambient situations such as changes in the amount of solar radiation or changes in the temperature and the maximum power point deviates. Accordingly, MPPT control always searches for the point (optimum operating voltage) at which the maximum power is obtained based on increase and reduction of power by changing the output voltage (operational voltage) of the solar battery 4 so as to extract the maximum power from the solar battery 4. The general search operation for the maximum power point is referred to as a climbing method in which the power difference $\Delta P$ is calculated by increasing the operational voltage by, for example, a very small amount $V\Delta$ and, when the power difference $\Delta P$ is 0 or more as a result, the current voltage is assumed to be present to the left (low voltage side) of the maximum power point and the voltage is changed in the direction same as before. When the power difference $\Delta P$ is 0 or less, the current voltage is assumed to be present to the right (high voltage side) of the maximum power point and the voltage is changed in the direction opposite to before. By repeating this process, the maximum power point can be searched for. As described above, MPPT control makes control so that the output power of the solar battery 4 becomes maximum (that is, the output voltage of the solar battery 4 becomes the maximum power point illustrated in FIG. 2).

Next, general voltage control will be described.

In voltage control, the voltage control range is preset based on the power-voltage characteristics of the solar battery 4 and the power of the solar battery 4 is obtained within the voltage control range.

The voltage control range in voltage control is set in the range to the right of the voltage that is the maximum power point of the power-voltage characteristics as illustrated in FIG. 2. If the output voltage of the solar battery 4 is smaller than the voltage (referred to below as the peak voltage) that is the maximum power point, the output power from the solar battery 4 starts reducing monotonously and the subsequent voltage control is disabled. Accordingly, the voltage range is set to prevent the output voltage of the solar battery 4 from becoming equal to or less than the peak voltage. In addition, as illustrated in FIG. 2, the peak voltage of power-voltage characteristics always changes depending on the ambient situations of the solar battery 4. Accordingly, to prevent the output voltage of the solar battery 4 from becoming equal to or less than the peak voltage even when the ambient situations change, the lower limit value of the voltage control range is set with a certain degree or margin provided from the peak value of the power-voltage characteristics. In voltage control, power is obtained by controlling the output voltage of the solar battery 4 within the voltage control range as described above.

While the lower limit value of voltage control range is set with a certain degree of margin provided from the peak value of the power-voltage characteristics in voltage control, the peak voltage at which the generated power becomes maximum is always searched for in MPPT control. Accordingly, generated power can be obtained from the solar battery 4 more efficiently by controlling the solar battery 4 with MPPT control.

Figure 3A:
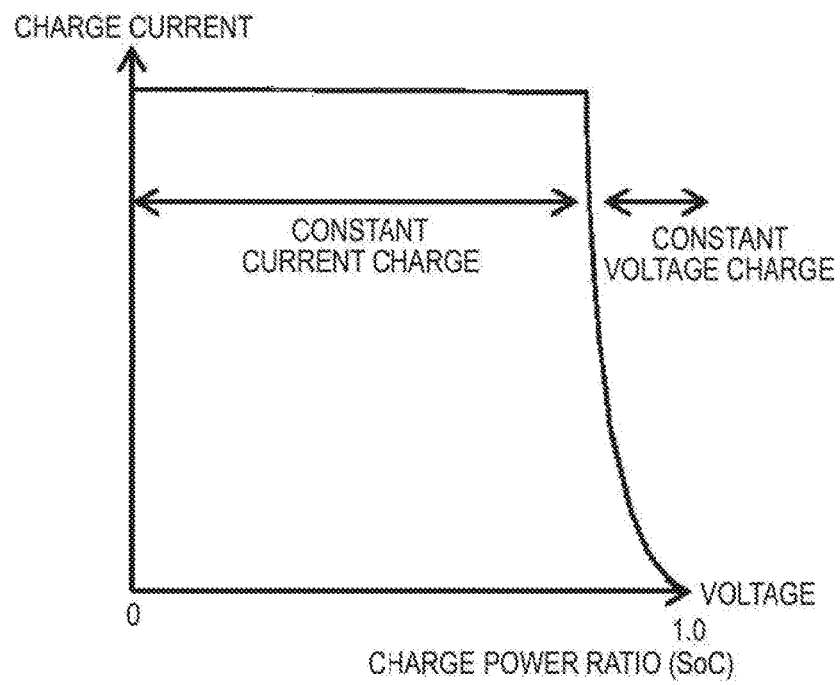
FIG. 3A, FIG. 3B is a characteristic diagram illustrating the characteristics of storage batteries according to embodiment 1 of the invention.
Figure 3B:
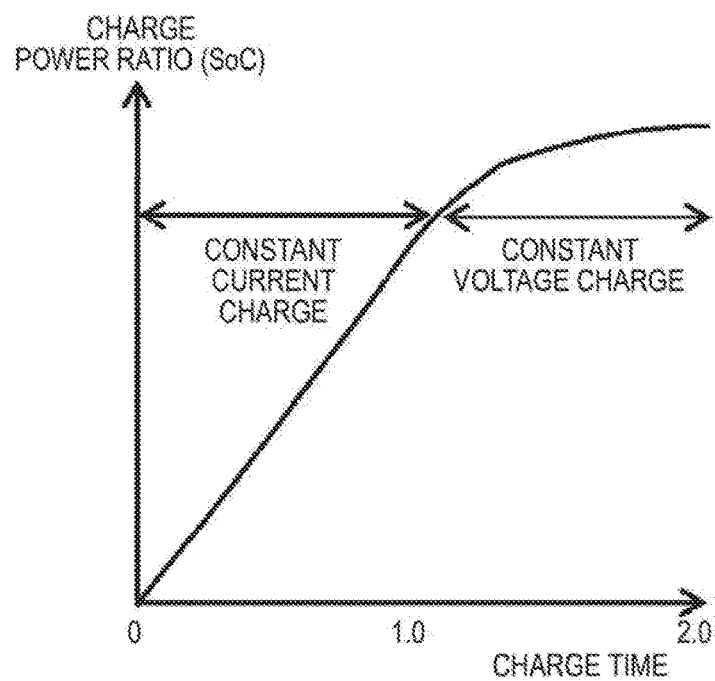
Figure 4A:
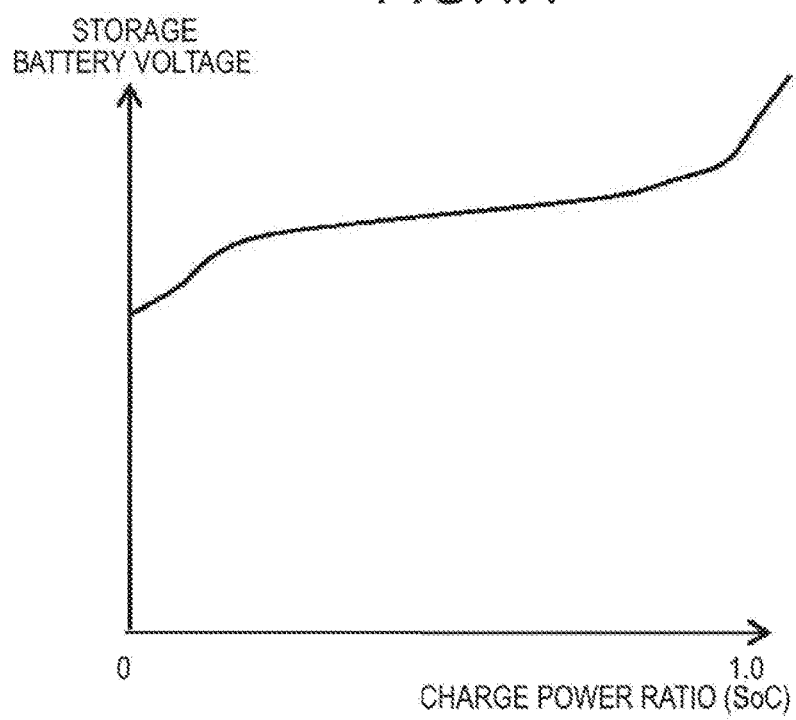
FIG. 4A FIG. 4B is a characteristic diagram illustrating the characteristics of the storage batteries according to embodiment 1 of the invention.

Next, the characteristics of the storage battery when lithium-ion batteries are used for the first storage battery 8a, the second storage battery 8b, and the third storage battery 8c as an example will be described. In FIG. 3A, the horizontal axis represents the charge power ratio (referred to below as the SoC) and the vertical axis represents the charge current. In FIG. 3B, the horizontal axis represents time and the vertical axis represents the SoC. In FIG. 4A, the horizontal axis represents the SoC and the vertical axis represents the storage battery voltage. Generally, when the storage battery is overcharged (charged until the storage battery voltage exceeds a predetermined value) or overdischarged (discharged until the storage battery voltage becomes equal to or less than a predetermined value), degradation proceeds more than necessary and the storage battery may be broken in the worst case. As illustrated in FIG. 4A, when a lithium-ion battery approaches full charge (SoC is 1.0), the storage battery voltage sharply rises. In addition, when the current ripple of charge current is large near full charge, degradation may proceed more than necessary. Accordingly, when the storage battery is charged, in order prevent the overcharge and reduce an amount of ripple of the charge current, constant current charge is performed until the storage battery voltage reaches a predetermined voltage and constant voltage charge is performed after the storage battery voltage reaches the predetermined voltage.

For example, FIG. 3B illustrates the relationship between the SoC and the charge time when constant current charge is performed until the storage battery voltage at which the SoC is 0.8 is reached and then constant voltage charge is performed until full charge is reached. Although dependence on the storage battery characteristics and the amount of current for constant current charge is present as illustrated in the drawing, an example of the case in which the charge time in the constant current control is 0.8 C (1 C is assumed to be the amount of current for fully charging the storage battery for one hour) is illustrated in FIG. 3B. As illustrated in the drawing, the time for charge in constant current control is substantially the same as the time for charge in constant voltage control. Unlike charge, switching of control is not performed generally until the storage battery voltage reaches the discharge termination voltage in the case of discharge.

Figure 4B:
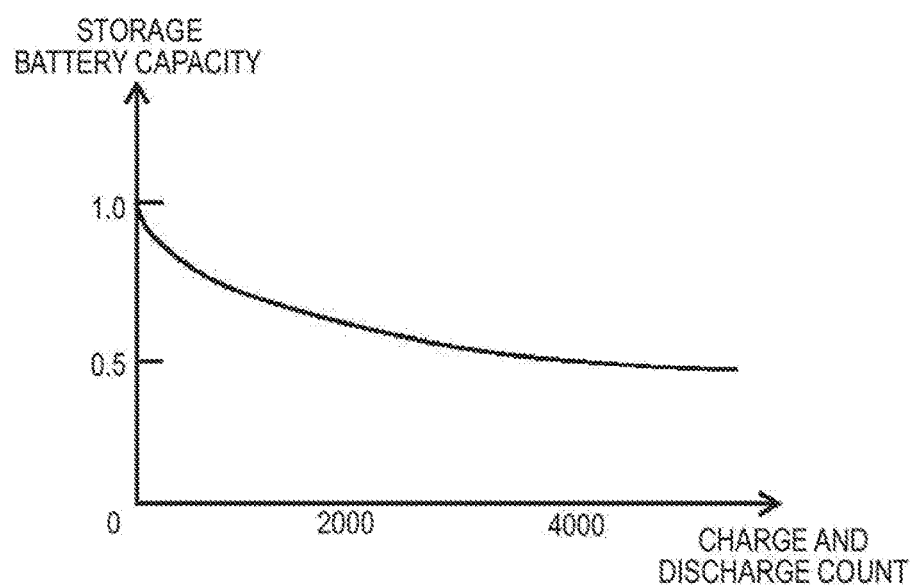

In addition, only if a lithium-ion battery is used, degradation proceeds generally. FIG. 4B illustrates an example of the relationship between the charge and discharge count of full charge and full discharge and the storage battery capacity. As illustrated in the drawing, when charge and discharge operation is performed approximately 4000 times, the capacity of the storage battery is reduced to approximately the half. The storage battery having been degraded needs to be replaced and the replacement timing may be determined arbitrarily or based on, for example, the storage battery capacity for safe use of the storage battery specified by the battery manufacturer.

Generally, typical factors promoting the degradation of the storage battery include the cell temperature, the charge and discharge current, the charge termination voltage, the discharge termination voltage, and the holding time of the storage battery. For example, as for the holding time, degradation proceeds in the state close to full charge than in the state close to fully discharge. In addition, as the air temperature is higher, degradation proceeds faster. In addition, as for the charge and discharge current, degradation proceeds faster as the amount of current is larger, and the rate of progress of degradation depends on the cell temperature of the storage battery. In addition, this is true for the charge termination voltage and the discharge termination voltage. For example, when the storage battery is not charged to approximately 90% of the original capacity of charge power, the degradation of the storage battery becomes smaller than in the case in which the storage battery is charge to 100%. Similarly, when the remaining amount of stored power on completion of discharge is larger, the degradation of the storage battery becomes smaller than in the case of full discharge. In addition, the progress of degradation during full charge or full discharge greatly depends on the cell temperature of the storage battery. Accordingly, by narrowing the use temperature range, it is expected that the degradation suppression effect obtained by limiting the maximum charge and discharge current and the use voltage range becomes larger.

A chemical reaction is used to charge or discharge a lithium-ion battery with power. For example, when an attempt is made to perform charge with a predetermined current (for example, 1 C) at low temperature, metal lithium is deposited because the chemical reaction cannot follow the charge current and the lithium-ion battery is degraded. When the storage battery is charged and discharged repeatedly without considering, for example, the storage battery cell temperature, the degradation of the storage battery proceeds more than necessary and the storage battery becomes unavailable before a desired use period (for example, 10 years) elapses. To address this problem in this case, the storage battery may be often provided with a function for forcibly separating the storage battery, for example, when the battery management unit in the storage battery detects overcharge or overdischarge or when charge and discharge are performed at high or low temperatures.

Figure 5A:
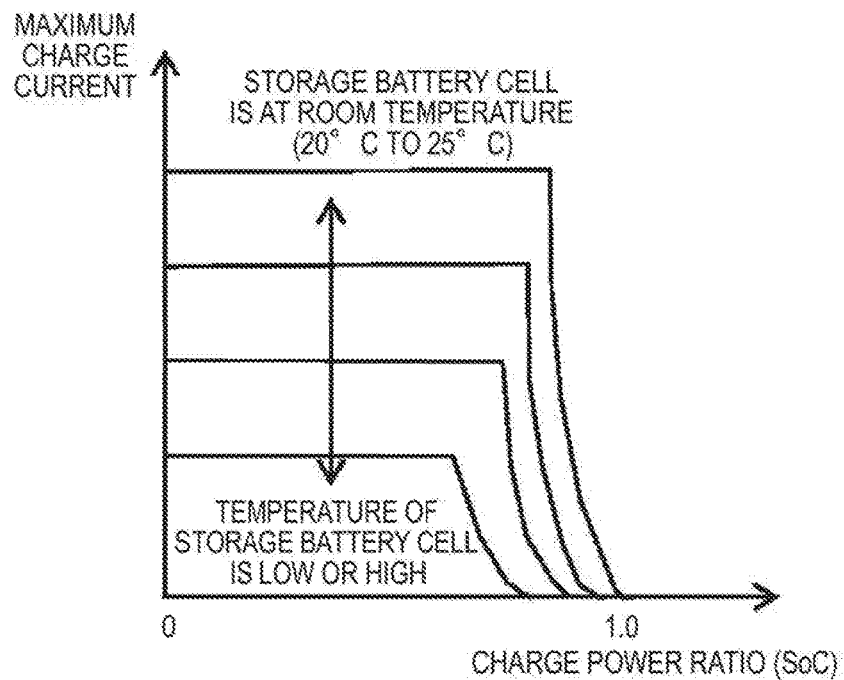
FIG. 5A, FIG. 5B is a characteristic diagram illustrating the characteristics of the storage batteries according to embodiment 1 of the invention.

Accordingly, limitations of the maximum charge and discharge current, the charge termination voltage, and the discharge termination voltage of the storage battery, which are degradation factors, based on the storage battery cell temperature will be described. FIG. 5A illustrates the relationship between the maximum charge and discharge current and the SoC for each cell temperature of the storage battery. As illustrated in the drawing, when the storage battery cell is at room temperature (for example, approximately 20° C. to 25° C.), the storage battery can be charged according to the rating. The reason why the maximum charge current is reduced when the SoC is 0.8 or more is that the charge control of the storage battery is switched from constant current control to constant voltage control as described above. When the storage battery cell temperature rises from room temperature, the maximum charge current gradually reduces and the SoC also reduces as illustrated in the drawing. When the storage battery cell temperature exceeds 45° C., charge operation is prohibited.

Figure 5B:
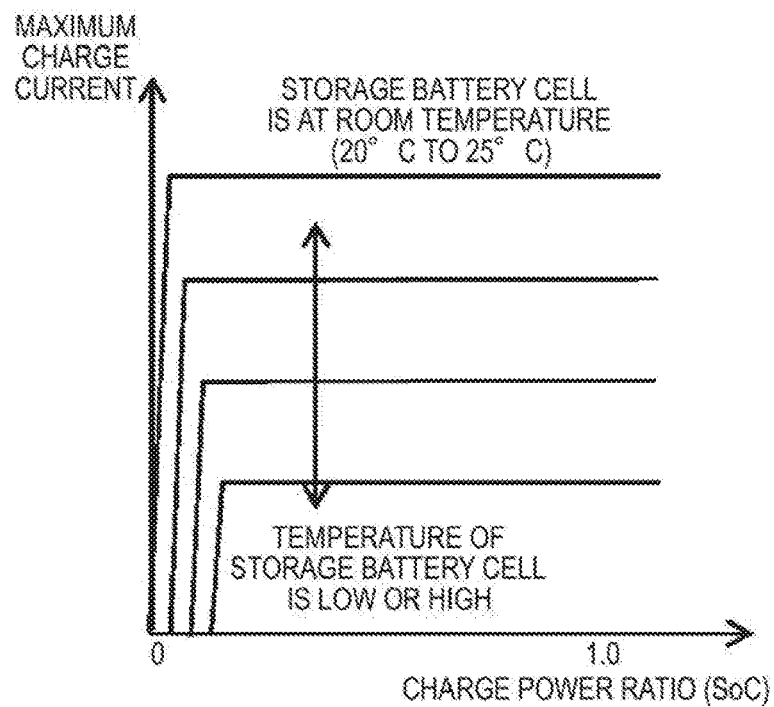

When the storage battery cell temperature is reduced to a value lower than room temperature, the maximum charge current is gradually reduced as illustrated in the drawing and the SoC is also reduced. When the storage battery cell temperature reaches 0° C. or less, the charge operation is prohibited. Similarly, FIG. 5B illustrates the relationship between the maximum discharge current and the SoC (charge power ratio) for each storage battery cell temperature. As illustrated in the drawing, when the storage battery cell is at room temperature (for example, approximately 20° C. to 25° C.), the storage battery can be discharged according to the rating. It should be noted that, when the SoC approaches 0, the maximum discharge current is sharply reduced to 0. When the storage battery cell temperature rises from room temperature, the maximum discharge current is gradually reduced and the SoC is increased. When the storage battery cell temperature is reduced to 0° C. or less, the discharge operation is prohibited.

It will be appreciated that the table for limiting the maximum value of the charge and discharge current with respect to the cell temperature of the storage battery is not limited to the tables illustrated in FIG. 5A and FIG. 5B and the table appropriate for the characteristics of storage battery to be used may be used. In addition, although the preservation degradation, which is one of the degradation factors of the storage battery, is not described, it will be appreciated that another limitation table may be provided to limit the upper limit value of the maximum amount of charge power (charge termination voltage) for high temperatures at which preservation degradation proceeds, for example.

The storage battery cell temperature, the maximum charge and discharge current, the charge termination voltage, the discharge termination voltage, and the preservation degradation, which are factors for promoting the degradation of the storage battery, have been described. In embodiment 1, according to the degrees of the degradation of the first storage battery 8a, the second storage battery 8b, and the third storage battery 8c, switching to a severer limitation is performed as degradation proceeds. This applies control having higher degradation suppression effects to the storage battery having been degraded, so the degrees of degradation of the first storage battery 8a, the second storage battery 8b, and the third storage battery 8c gradually get close to each other.

Figure 6:
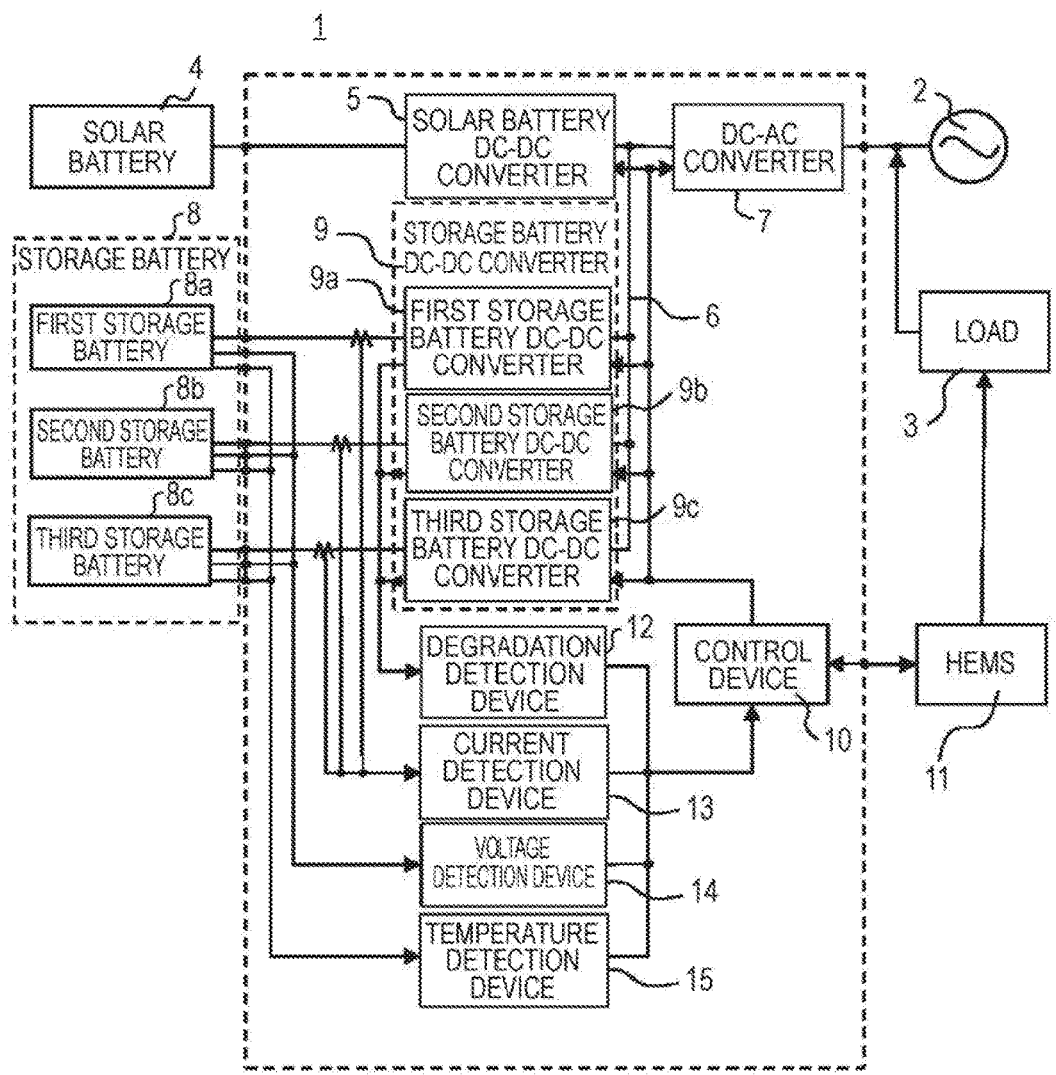
FIG. 6 is the second structural block diagram illustrating the power conversion system according to embodiment 1 of the invention.

Next, the operation of the power conversion system 1 will be described in detail. However, for simplicity, as illustrated in FIG. 6, the first storage battery 8a, the second storage battery 8b, and the third storage battery 8c are collectively described as one storage battery 8 and the first storage battery DC-DC converter 9a, the second storage battery DC-DC converter 9b, and the third storage battery DC-DC converter 9c are collectively described as one storage battery DC-DC converter 9. It should be noted that the operation in the storage battery 8 and the storage battery DC-DC converter 9 will be described later.

First, normal operation when the electric power system 2 operates normally will be described.

First, the operation of the power conversion system 1 with respect to the solar battery 4 will be described.

During normal operation of the power conversion system 1, the control device 10 checks whether power is generated by the solar battery 4. Specifically, the control device 10 checks whether the measurement value by a voltmeter (not illustrated) for measuring the voltage of the solar battery 4 exceeds a predetermined value. It should be noted that this predetermined value is preset as a value beyond which power generation by the solar battery 4 is enabled. When the measurement value of the voltage of the solar battery 4 exceeds the predetermined value, the control device 10 determines that no power interruption occurs in the electric power system 2. When no power interruption occurs in the electric power system the control device 10 starts the DC-AC converter 7 and starts power generation by the solar battery 4. When the DC-AC converter 7 is started, the bus line voltage of the DC bus line 6 is controlled to become a preset first control target voltage. In addition, the power regenerated in the electric power system 2 operates the entire system by current control by the DC-AC converter 7. It should be noted that the operation for confirming that no power interruption occurs in the electric power system 2 will be described later.

When power generation by the solar battery 4 is started, the control device 10 inputs a control command value for MPPT control to the solar battery DC-DC converter 5. The solar battery DC-DC converter 5 operates according to the command value, converts a first DC voltage V1 output from the solar battery 4 to a second DC voltage V2, and outputs the second DC voltage V2.

When the supply of the generated power by the solar battery 4 from the solar battery DC-DC converter 5 is started, the control device 10 drives and controls the DC-AC converter 7 to cause the power from the solar battery 4 to be output to the electric power system 2 and the load 3. It should be noted that the outputting (regeneration) of the power from the solar battery 4 to the electric power system 2 is determined by the control device 10. Specifically, the control device 10 monitors the bus line voltage using a voltmeter (not illustrated) for measuring the bus line voltage of the DC bus line 6 and, when the measurement value of the bus line voltage exceeds the first control target voltage, controls the DC-AC converter 7 so that the power is regenerated in the electric power system 2 in sync with the AC voltage waveform supplied from the electric power system 2.

Next, the control method for the storage battery 8 will be described. In embodiment 1, the case in which a lithium-ion battery is used as a storage battery will be described. As described above, when a lithium-ion battery is charged and discharged at high temperature or low temperature, the progress of degradation is accelerated. In addition, a lithium-ion battery is very vulnerable to overdischarge or overcharge. In particular, since the storage battery voltage quickly rises when the amount of stored power of a storage battery is 80% or more, the charge system is switched from constant current charge (charge at a constant current) to constant voltage charge (charge so as to make the battery voltage constant) in the control of a general storage battery. In addition, as for discharge, discharge control is performed by providing a margin for the discharge termination voltage to prevent overdischarge. Specifically, the discharge termination voltage is set on the high side and, immediately after the storage battery voltage falls below the discharge termination voltage, the discharge operation is stopped.

Description is continued on the assumption that the storage battery 8 is controlled using a limitation table for defining the maximum charge and discharge current of the storage battery 8 in embodiment 1. The limitation table defines the relationship between the maximum charge and discharge current and the SoC with respect to the storage battery temperature and is prepared for each temperature. For example, two sets (charge and discharge) of six types of tables corresponding to 0° C., 5° C., 10° C., 25° C., 30° C., and 35° C. are prepared. It is assumed that these limitation tables are rewritable from the HEMS 11 in embodiment 1. The reasons why these six types of tables are prepared are that the characteristic of the maximum value of the charge and discharge current does not change in the range from about 10 to 30° C. in a lithium-ion battery, but the maximum value of the charge and discharge current needs to be sharply reduced at temperature equal to or less than 10° C. or more than 30° C. to suppress the progress of degradation of the storage battery. In addition, at temperature equal to or less than −5° C. or more than 40° C., charge and discharge cannot be performed. Accordingly, six types of tables as described above are used in embodiment 1. It should be noted that, for temperature such as 7° C. not covered by the limitation tables, the maximum charge and discharge current value is calculated by linear interpolation using the table for 5° C. and the table for 10° C.

The limitation tables will be described below in more detail. In embodiment 1, the limitation tables are rewritten from the HEMS 11 according to the progress of degradation of the storage battery. When the limitation tables are rewritten according to the progress of degradation of the storage battery as described above, for the storage battery 8 having been degraded, the progress of degradation of the storage battery can be suppressed by increasing the limitation on the maximum current value and the limitation on the termination voltage of charge and discharge. In addition, since the limitation tables are rewritten from the HEMS 11 provided outside the power conversion system 1, it will be appreciated that the control device 10 does not need to have unnecessary data and the cost can be reduced. When the memory size is sufficient, it will be appreciated that the control device 10 may have the data of the limitation tables. In addition, when the data of the limitation tables is managed by a cloud server (not illustrated) or the like instead of the HEMS 11, the data is downloaded from the cloud server according to the progress of degradation, and the data of the limitation tables in the control device 10 is rewritten via the HEMS 11, it is possible to obtain the effect of reducing the cost and putting the plurality of power conversion systems 1 in the same control state since the control device 10 and the HEMS 11 do not need to have unnecessary data.

As described above, when receiving a charge and discharge command from the HEMS 11, the control device 10 checks the storage battery temperature using the temperature detection device 15. In embodiment 1, the maximum charge and discharge current value and the charge and discharge termination voltage are obtained from the limitation tables based on the check result. Then, the charge and discharge current is determined based on the obtained maximum charge and discharge current value. Specifically, the charge and discharge current value is calculated based on the charge and discharge command value from the HEMS 11. For example, in the case of a discharge instruction, the current value is calculated in consideration of the loss in the storage battery 8 and the storage battery DC-DC converter 9. The calculated current value is compared with the maximum charge and discharge current value obtained from the limitation tables. When the calculated current value exceeds the maximum charge and discharge current value, the maximum charge and discharge current value is used as the target current value for controlling the storage battery 8. When the calculated current value does not exceed the maximum charge and discharge current value, the current value calculated based on the charge and discharge command value instructed by the HEMS 11 is used to control the charge and discharge of the storage battery 8.

It should be noted that, when the storage battery 8 operates, the temperature of the storage battery rises due to loses of the storage battery 8 (or loses of the storage battery DC-DC converter 9, loses of the DC-AC converter 7, loses of the solar battery DC-DC converter 5, and the like when various types of converters are contained together with the storage battery 8 in the same cabinet). Accordingly, the control device 10 measures the temperature of the storage battery 8 periodically (for example, at intervals of one second) using the temperature detection device 15 and switches the maximum charge and discharge current value. That is, it will be appreciated that the temperature detection device 15 functions as a temperature information acquisition device that detects the temperature information of the storage battery 8 and, at that time, the control device 10 calculates the SoC based on the charge and discharge current value and calculates the maximum value of the charge and discharge current based on the calculated result. In addition, although the SoC is calculated based on the charge and discharge current value in embodiment 1, the invention is not limited to the embodiment and it will be appreciated that, for example, the voltage value of the storage battery 8 may be used.

Next, the operation of the storage battery 8 of the power conversion system 1 during normal operation will be described.

The control device 10 instructs the charge and discharge of the storage battery 8 as described above. For example, when receiving a status information transmission request of the storage battery 8 from the HEMS 11, the control device 10 reports the determination result of the feasibility of discharge or charge and the maximum discharge power or the maximum charge power to the HEMS 11. Specifically, as described above, the maximum charge and discharge current is calculated, based on the storage battery temperature and the SoC. Then, the voltage of the storage battery 8 and the maximum power of charge and discharge based on the maximum charge and discharge current are reported. At this time, the HEMS 11 is notified in consideration of losses of the storage battery 8, the storage battery DC-DC converter 9, and the DC-AC converter 7. The HEMS 11 reports, to the control device 10, a discharge instruction (including a discharge power instruction value) for the storage battery 8 or a charge instruction (including a charge power instruction value) for the storage battery 8 based on the status information (the information of the feasibility of charge and discharge and the maximum mount of power of charge and discharge) received from the control device 10. It should be noted that communication between the HEMS 11 and the control device 10 is performed periodically (for example, at intervals of five minutes) in embodiment 1. This is performed by the HEMS 11 to grasp the operation of the storage battery 8 in the case in which the storage battery temperature is increased by charge and discharge as described above and the maximum charge and discharge current is reduced or the case in which the SoC approaches a predetermined value during charge and the charge current is reduced.

First, the case in which a discharge instruction has been reported from the HEMS 11 will be described.

When receiving a report about a discharge instruction, the control device 10 calculates the actual discharge power from the storage battery 8 based on the voltage information obtained by the voltage detection device 14 for detecting the voltage of the storage battery 8 and the current information obtained by the current detection device 13 for detecting the charge and discharge current of the storage battery 8. A control command for the storage battery DC-DC converter 9 is output so that the calculation result becomes the received discharge power instruction value. The storage battery DC-DC converter 9 operates according to the control command, converts a third DC voltage V3 output from the storage battery 8 to a fourth DC voltage V4, and output the fourth DC voltage V4. The output from the storage battery 8 having been converted to the fourth DC voltage V4 is supplied to the electric power system 2 and the load 3 via the DC-AC converter 7. As in the above case in which the power of the solar battery 4 is output to (regenerated in) the electric power system 2, the output (regeneration) of the power from the storage battery 8 to the electric power system 2 is determined by the control device 10. When the measurement value of the bus line voltage of the DC bus line 6 by a voltmeter (not illustrated) exceeds the first control target voltage, the control device 10 controls the DC-AC converter 7 so that power is regenerated in the electric power system 2.

As described above, the control device 10 can collect the discharge power actually output from the storage battery DC-DC converter 9 as the status information of the storage battery DC-DC converter 9, obtain conversion losses in the storage battery DC-DC converter 9, and perform the discharge control of the storage battery 8 by adding the losses. Although the charge and discharge control of the storage battery 8 is reported by the HEMS 11 in embodiment 1, the invention is not limited to the embodiment. For example, to sell the generated power of the solar battery 4 at the maximum, the current used by the load 3 is measured by an ammeter (not illustrated) and the power consumption of the load is calculated based on the measurement result. It will be appreciated that the power consumption of the load may be discharged from the storage battery 8 based on the calculation result. At this time, it will be appreciated that the maximum value of the discharge current is controlled using the limitation tables in the above manner.

In addition, the control device 10 manages the status information such as the amount of charge of the storage battery 8. Specifically, the control device 10 collects the history of charge and discharge of the storage battery 8 to estimate the progress of degradation of the storage battery 8, which will be described later. In embodiment 1, the control device 10 measures the termination voltage during charge and discharge, the charge and discharge maximum current value, the average of the charge and discharge current value, the charge and discharge power amount, the average value of the storage battery temperature, the maximum and minimum values, the holding time when the SoC is 0.8 or more, and the like and manages the information daily. It should be noted that, in embodiment 1, the control device 10 collects the above information and the HEMS 11 or a cloud server (not illustrated) performs actual data management.

On the other hand, the case in which a charge instruction has been reported by the HEMS 11 will be described.

When receiving a report about a charge instruction, the control device 10 calculates the actual charge power for the storage battery 8 based on the voltage information obtained by the voltage detection device 14 for detecting the voltage of the storage battery 8 and the current information obtained by the current detection device 13 for detecting the charge and discharge current of the storage battery 8. A control command for the storage battery DC-DC converter 9 is output so that the calculation result becomes the received charge power instruction value. The storage battery DC-DC converter 9 operates according to the control command and charges the storage battery 8.

It should be noted that, when the storage battery 8 is charged, the generated power of the solar battery 4 is preferentially used to charge the storage battery 8. When surplus power is present after the charge power of the storage battery 8 is fully covered by the generated power of the solar battery 4, the surplus power is output to the electric power system 2 and the load 3. When the charge power of the storage battery 8 is not covered by the generated power of the solar battery 4, the power shortage is covered by the electric power system 2. Specifically, the control device 10 monitors the bus line voltage via a voltmeter (not illustrated) for measuring the bus line voltage of the DC bus line 6 and, when the measurement value of the bus line voltage is smaller than the first control target voltage, controls the DC-AC converter 7 so that running power is obtained from the electric power system 2 to the power conversion system 1. At this time, the history of charge and discharge of the storage battery 8 is collected to estimate the progress of degradation of the storage battery 8 (the information to be collected is described above, so it is not described here), as described in the above discharge operation.

Although the charge control of the storage battery 8 is reported by the HEMS 11 in embodiment 1, the invention is not limited to the embodiment and it will be appreciated that an ammeter (not illustrated) is used to measure the current to be sold (the power generation current of the solar battery 4 and the consumption current of the load 3) so as to, for example, store the surplus power of the generated power of the solar battery 4 and the power to be sold is calculated based on the calculation result. It will be appreciated that the charge of the storage battery 8 may be controlled so that the power to be sold becomes 0 or minimum. It will be appreciated that, at this time, the maximum value of the charge current is controlled using the limitation tables in the above manner.

In addition, during normal operation, the determination when the generated power from the solar battery 4 and the discharge power from the storage battery 8 are output to (regenerated in) the electric power system 2 and the determination when power is transferred (powering) from the electric power system 2 to the power conversion system 1 are made based on the measurement value of the bus line voltage of the DC bus line 6.

Next, power interruption detection operation will be described. During normal operation, the control device 10 checks the occurrence of a power interruption in the electric power system 2 so as to always confirm that there is no power interruption. The detection as to whether no power interruption occurs in the electric power system 2 is referred to below as individual running detection.

During normal operation, the control device 10 performs individual running detection based on the measurement result by a voltmeter (not illustrated) for measuring the system voltage of the electric power system 2, the measurement result by an ammeter (not illustrated) for measuring the AC current between the DC-AC converter 7 and the electric power system 2, and the output phase of the DC-AC converter 7 regenerated to the electric power system 2. Details on the method for individual running detection are the same as that defined in the grid connection regulation (JEAC9701-2010), so detailed description is omitted in embodiment 1.

When individual running is detected in the individual running detection by the control device 10, since some type of abnormality such as a power interruption has occurred in the electric power system 2, the power conversion system 1 starts independent operation.

The operation (referred to below as independent operation) of the power conversion system 1 when a power interruption has occurred in the electric power system 2 will be described.

When detecting individual running, the control device 10 stops the solar battery DC-DC converter 5 and the storage battery DC-DC converter 9. When confirming that the solar battery DC-DC converter 5 and the storage battery DC-DC converter 9 have been stopped, the control device 10 stops the DC-AC converter 7.

Then, the switch (not illustrated) or the like disposed between the electric power system 2 and the power conversion system 1 and the load 3 is automatically turned off to disconnect the electric power system 2 from the power conversion system 1 and the load 3. It will be appreciated that disconnection from the electric power system 2 may be performed manually by the user.

Next, the control device 10 checks the feasibility of discharge from the storage battery 8 and the dischargeable power, controls the storage battery DC-DC converter 9 via voltage control if discharge is enabled, and starts discharge from the storage battery 8.

The voltage control of the storage battery DC-DC converter 9 will be described.

As described above, during normal operation, the bus line voltage of the DC bus line 6 is controlled by the DC-AC converter 7. However, since power is not supplied from the electric power system 2 during a power interruption, the DC-AC converter 7 cannot control the bus line voltage. Therefore, the bus line voltage is basically controlled by the storage battery DC-DC converter 9 capable of outputting a desired voltage by receiving power from discharge of the storage battery 8. Specifically, the control device 10 obtains a measurement value by a voltmeter (not illustrated) for measuring the bus line voltage and controls the output voltage of the storage battery DC-DC converter 9 so that this measurement value becomes the preset first control target voltage.

It should be noted that, in embodiment 1, the first control target voltage during independent operation is set to the value identical to the first control target voltage assumed when the bus line voltage is controlled by the DC-AC converter 7 based on a command from the control device 10, which has been described during normal operation above. However, the first control target voltage does not necessarily need to be set to the value identical to the first control target voltage assumed when the bus line voltage is controlled by the DC-AC converter 7 and the first control target voltage may be set to a different value as necessary.

When the bus line voltage becomes the first control target voltage via voltage control by the storage battery DC-DC converter 9, the control device 10 starts the DC-AC converter 7 via voltage control. Specifically, the control device 10 internally generates a reference sine wave (for example, 60 Hz) used as the reference and controls the DC-AC converter 7 so that the voltage waveform measured by a voltmeter (not illustrated) for measuring the output voltage of the DC-AC converter 7 matches the reference waveform. When power is supplied from the DC-AC converter 7, the load 3 starts up and starts power consumption. At this time, since the bus line voltage becomes lower than the first control target voltage if discharge power from the storage battery 8 is insufficient, the control device 10 outputs a control command for increasing discharge power from the storage battery 8, to the storage battery DC-DC converter 9 so as to maintain the first control target voltage.

When the supply of power from the DC-AC converter 7 to the load 3 is started, the control device 10 starts the power generation from the solar battery 4. The control of the solar battery 4 in the power conversion system 1 during a power interruption will be described below.

The control device 10 checks whether the voltage of the solar battery 4 is equal to or more than a predetermined value based on a measurement value acquired from a voltmeter (not illustrated) for measuring the voltage of the solar battery 4. When the voltage of the solar battery 4 is less than the predetermined value, the control device 10 determines that the solar battery 4 cannot generate electric power and waits until the voltage of the solar battery 4 reaches the predetermined value. When the voltage of the solar battery 4 is equal to or more than the predetermined value, the control device 10 starts the solar battery DC-DC converter 5 via voltage control. It should be noted that the predetermined value is a preset value beyond which the power generation of the solar battery 4 is enabled. Although this value is set to this predetermined value used to determine whether the power generation of the solar battery 4 is enabled during normal operation, this predetermined value may be set as appropriate when needed.

The control device 10 controls the solar battery DC-DC converter 5 via voltage control so that the bus line voltage becomes a preset second control target voltage. Specifically, the control device 10 obtains the measurement value by the voltmeter (not illustrated) for measuring the bus line voltage of the DC bus line 6 and controls the output voltage of the solar battery DC-DC converter 5 so that this measurement value becomes the second control target voltage.

Here, the second control target voltage in voltage control is set to a value larger than the first control target voltage, which is the target value of the bus line voltage by the storage battery DC-DC converter 9.

To stably supply power for a long time during a power interruption, electric power (natural energy) generated by the solar battery 4 needs to be used preferentially without unnecessarily using power charged in the storage battery 8. As described above, the second control target voltage, which is the target value of the bus line voltage in voltage control by the solar battery DC-DC converter 5, is set to a value larger than the first control target voltage, which is the target value of the bus line voltage in voltage control by the storage battery DC-DC converter 9. Accordingly, when the generated power by the solar battery 4 is sufficient, the bus line voltage can be kept at the second control target voltage by output power from the solar battery 4 and discharge from the storage battery 8 can be suppressed during this period.

In contrast, when the power consumption by the load 3 exceeds the generated power by the solar battery 4, the generated power by the solar battery 4 cannot keep the bus line voltage at the second control target voltage and the bus line voltage is reduced. When the bus line voltage is reduced, discharge from the storage battery 8 is started so that the bus line voltage does not become lower than the first control target voltage, which is the target value of the bus line voltage in voltage control by the storage battery DC-DC converter 9, and the bus line voltage is adjusted to the first control target voltage. When the power consumption by the load 3 is reduced and the generated power by the solar battery 4 can sufficiently cover the power consumption by the load 3, the bus line voltage rises, the bus line voltage is adjusted to the second control target voltage again, and discharge from the storage battery 8 can be suppressed.

As described above, power can be supplied to the load 3 regardless of whether normal operation or a power interruption is in progress.

The operation in the storage battery 8 and the storage battery DC-DC converter 9 will be described when the storage battery 8 includes a plurality of storage batteries (see FIG. 1).

First, the operation in the storage battery 8 and the storage battery DC-DC converter 9 during normal operation will be described with reference to FIGS. 1 and 7.

As described above, the charge and discharge of the storage battery 8 are performed when the storage battery DC-DC converter 9 is operated according to a control command from the control device 10 having received a discharge instruction or a charge instruction from the HEMS 11. This means that the first storage battery DC-DC converter 9a, the second storage battery DC-DC converter 9b, and the third storage battery DC-DC converter 9c are controlled so that the sum of the charge and discharge power of the first storage battery 8a, the second storage battery 8b, and the third storage battery 8c meets the discharge instruction or the charge instruction according to the control command from the control device 10 having received the discharge instruction or the charge instruction from the HEMS 11, and the control device 10 outputs control commands to the first storage battery DC-DC converter 9a, the second storage battery DC-DC converter 9b, and the third storage battery DC-DC converter 9c by following the flowchart illustrated in FIG. 7.

The method used by the control device 10 to determine control commands for the first storage battery DC-DC converter 9a, the second storage battery DC-DC converter 9b, and the third storage battery DC-DC converter 9c following the flowchart in FIG. 7 will be described.

In step 1, the control device 10 detects the degradation of the first storage battery 8a, the second storage battery 8b, and the third storage battery 8c at predetermined intervals (daily in embodiment 1). It should be noted that, as described above, the control device 10 daily collects information such as the termination voltage for charge and discharge, the charge and discharge maximum current value, the average of charge and discharge current value, the amount of charge and discharge power, the average value, the maximum value, and the minimum value of the storage battery temperature, the holding time (status information) when the SoC is 0.8 or more that are measured by the degradation detection device 12. The collected data is sent to the HEMS 11.

In embodiment 1, by switching between the limitation tables of the first storage battery 8a, the second storage battery 8b, and the third storage battery 8c at predetermined intervals depending on the progress of degradation to match the degrees of progress of the first storage battery 8a, the second storage battery 8b, and the third storage battery 8c, so that the first storage battery 8a, the second storage battery 8b, and the third storage battery 8c can be replaced substantially at the same time. Here, a determination is made as to whether the degradation detection timings at preset intervals are used. The processing proceeds to step 2 when the degradation detection timings are used or the processing proceeds to step 4 when this degradation detection timings are not used. It should be noted that the degradation detection timings of the first storage battery 8a, the second storage battery 8b, and the third storage battery 8c may be the same or different.

In step 2, the HEMS 11 estimates the degradation state based the history database construct method based on the status information input by the control device 10. Although the specific method for estimating the degradation state is not described, by preparing a degradation estimation expression using the status information as parameters and inputting the status information to the degradation estimation expression, the progress of degradation is calculated at predetermined intervals (daily in embodiment 1), and the calculated progress of degradation is added to the progress of degradation of the previous day. In addition, in embodiment 1, storage battery capacity measurement means (not illustrated) for measuring the battery capacity of the storage battery is provided, the storage battery is fully discharged and fully charged at least periodically (for example, once a half year or so), the capacity of the storage battery 8 is measured actually, and the progress of degradation based on the history database construction method is corrected according to the result of actual measurement. By correcting the progress of degradation based on the actual measurement value as described above, storage battery degradation caused by manufacturing variations of the storage battery 8 and the like can also be corrected.

In addition, the HEMS 11 receives the status information of the first storage battery 8a, the second storage battery 8b, and the third storage battery 8c from the control device 10 and calculates the progress of degradation of the storage batteries 8a, 8b, and 8c. The reason why the progress of degradation is measured for each of the storage batteries 8a, 8b, and 8c is that the degradation of the storage batteries 8 differs depending on manufacturing variations, installation conditions, and the like. For example, when the first storage battery 8a is installed at a position exposed to the afternoon sun and the second storage battery 8b and the third storage battery 8c are installed in the shade, the average temperature of the first storage battery 8a is highest. Accordingly, the first storage battery 8a is assumed to be more degraded than in the second storage battery 8b and the third storage battery 8c.

Although the progress of degradation of the storage battery 8 for one day is calculated using a degradation estimation expression in embodiment 1, the invention is not limited to the embodiment and it will be appreciated that the progress of degradation may be calculated using all the status information from the start of operation until now. In addition, any method that can be easily thought by those skilled in the art is available as the degradation detection method and, for example, the history database construction method, the DC resistance measurement method, the AC impedance measurement method, the discharge curve analysis method, the charge curve analysis method, and the like can be used.

The history database construction method, the DC resistance measurement method, the AC impedance measurement method, the discharge curve analysis method, and the charge curve analysis method will be described below.

History Database Construction Method

This method evaluates the degradation state based on the use history of a storage battery by exhaustively treating the environmental condition and the use condition of charge, discharge, and the like of the storage battery as degradation measurement data.

DC Resistance Measurement Method

This method measures the recovery time voltage when no current flows and the discharge time voltage when a constant current flows, obtains the DC resistance by dividing the difference between the recovery time voltage and the discharge time voltage by the discharge current, and evaluates the degradation of a battery based on changes in the DC resistance.

AC Impedance Measurement Method

This method obtains the resistances of individual parts of a battery based on the graph representing the real part and the imaginary part of the AC impedance measured by changing the frequency and evaluates the degradation of the battery based on changes in the resistance.

Discharge Curve Analysis Method

This method extracts changes in the capacities of active materials by performing characterization that, for example, differentiates the discharge curve with respect to the voltage.

Charge Curve Analysis Method

This method obtains the capacity and resistance by performing regression calculation using the capacities and internal resistances of active materials as variables based on the open circuit voltage with respect to changes in the cell voltage during charge.

Although the HEMS 11 detects degradation in embodiment 1, degradation may be detected by acquiring the data necessary for detection of degradation using the degradation detection device 12 and analyzing the data in the control device 10, the degradation detection device 12, or a cloud server (not illustrated).

In step 3, the control device 10 updates the limitation tables of the first storage battery 8a, the second storage battery 8b, and the third storage battery 8c based on the progress of degradation of the first storage battery 8a, the second storage battery 8b, and the third storage battery 8c detected by the HEMS 11 in step 2 and the processing proceeds to step 4. It should be noted that, in embodiment 1, data in the limitation tables used to control the storage batteries 8 in the control device 10 is rewritten from the HEMS 11. The limited items update the table representing the relationship between the maximum charge and discharge current and the SoC with respect to the storage battery cell temperatures illustrated in FIG. 5 in embodiment 1. The storage battery 8 can perform switching among the maximum charge and discharge current, the usable voltage range, and the usable temperature range with respect to the SoC according to the degree of degradation by using the tables.

Although the case in which the three items are limited is continuously described in embodiment 1, the invention is not limited to the embodiment and it will be appreciated that the table for limiting at least one of the maximum charge and discharge current and the usable voltage range only needs to be prepared in addition to the table for limiting the usable temperature range according to the progress of degradation of the first storage battery 8a, the second storage battery 8b, and the third storage battery 8c and this table only needs to be updated. For example, when the use voltage range is limited, FIG. 8 illustrates the relationship between the capacity retention ratio (capacity retention ratio=1.0−progress of degradation) and the use voltage range when, for example, the storage battery temperature is 25° C.

Figure 8:
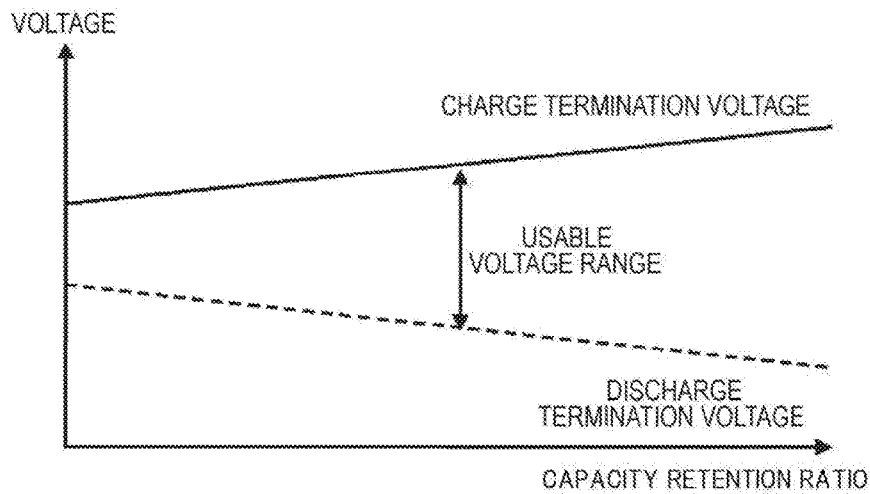
FIG. 8 illustrates an example of the usable voltage range with respect to the capacity retention ratio of the storage batteries according to embodiment 1 of the invention.

Setting is made so that the charge termination voltage (solid line) is reduced and the discharge termination voltage (dotted line) is increased in proportion to reduction in the capacity retention ratio as illustrated in FIG. 8 to narrow the usable voltage range as the capacity retention ratio is reduced.

Although the termination voltages are represented by straight lines to simplify description in FIG. 8, the invention is not limited to this example and it will be appreciated that the suppression effect of the progress of degradation is improved by controlling the termination voltages according to the characteristics of the storage battery 8.

Figure 9:
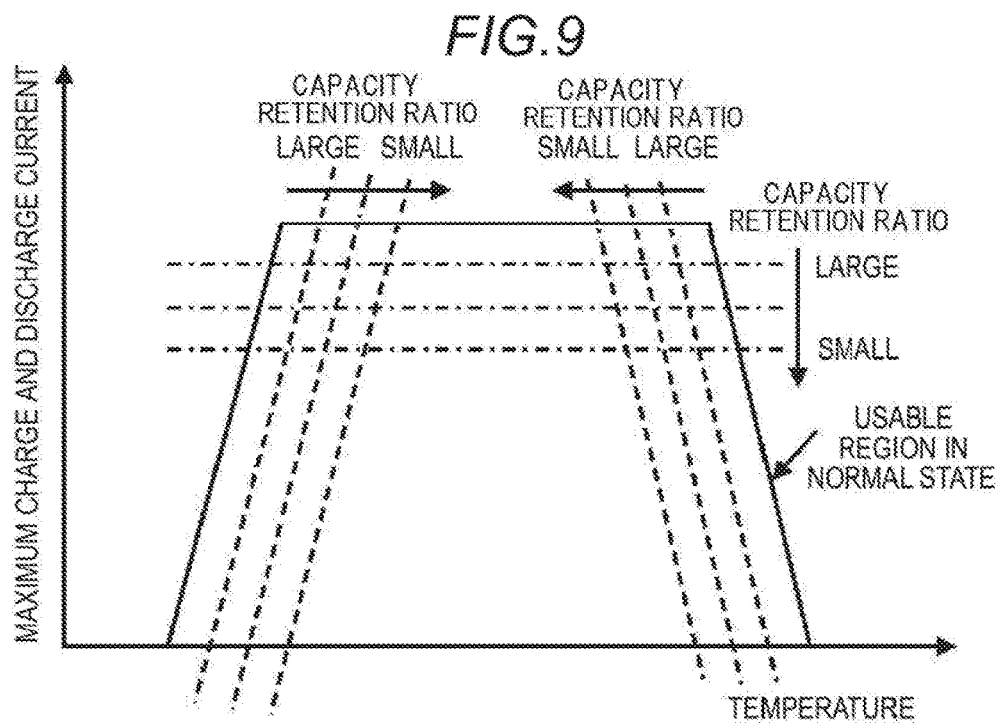
FIG. 9 illustrates an example of the maximum charge and discharge, current with respect to the temperature of the storage batteries according to embodiment 1 of the invention.

Next, FIG. 9 represents the relationship between the temperature and the maximum charge and discharge current for a certain SoC. Since the maximum charge and discharge current depends on the storage battery temperature, the usable region in the normal state is represented by a trapezoid as illustrated by the solid line in FIG. 9. When the maximum charge and discharge current is limited, horizontal lines are added inside the trapezoid as illustrated by dot-dash lines. In addition, when the usable temperature range is limited, oblique lines are added inside the trapezoid as illustrated by dotted lines. As the capacity retention ratio is reduced, an oblique line is added on a more inner side to narrow the usable region. Since the main degradation factors of the storage battery include the temperature during charge and discharge, the amplitude of charge and discharge current, the voltage during holding, the storage battery temperature, and the charge and discharge depth, degradation can be suppressed by operating the first storage battery 8a, the second storage battery 8b, and the third storage battery 8c in the state in which the capacity retention ratio decreases due to progress of deterioration, the usable temperature range is narrowed and limitation on at least one of the maximum charge/discharge current and usable voltage range is increased.

In step 4, the control device 10 obtains the maximum charge and discharge currents based on the SoC information of the first storage battery 8a, the second storage battery 8b, and the third storage battery 8c and the limitation tables of the first storage battery 8a, the second storage battery 8b, and the third storage battery 8c and multiplies the maximum charge and discharge currents by the storage battery voltages to calculate chargeable and dischargeable power P1, P2, and P3. In addition, the control device 10 also determines the feasibility of charge and discharge based on the limitation tables and the SoC information. Then, the control device 10 reports, to the HEMS 11, the determination result of the feasibility of charge and discharge and the chargeable and dischargeable power P1, P2, and P3. It will be appreciated that the same effect can be obtained when the maximum charge power or the maximum discharge power is reported as 0 without determining the feasibility of charge and discharge.

For example, the specific method for checking the chargeable and dischargeable power P1, P2, and P3 will be described below. First, the temperatures of the first storage battery 8a, the second storage battery 8b, and the third storage battery 8c are detected by the temperature detection device 15, the detected temperatures are compared with the usable region including the maximum charge and discharge current and the usable temperature range set in step 3, and the maximum charge and discharge currents at the detected temperatures are obtained. Next, the voltages of the first storage battery 8a, the second storage battery 8b, and the third storage battery 8c are detected by the voltage detection device 14 and the chargeable and dischargeable power P1, P2, and P3 of the first storage battery 8a, the second storage battery 8b, and the third storage battery 8c are checked by totalizing the maximum charge and discharge currents at the detected voltages and the detected temperatures. It should be noted that the HEMS 11 adds the chargeable and dischargeable power P1, P2, and P3, calculates the maximum value of the charge and discharge power from the power conversion system 1, and calculates the charge and discharge power P0 using the first storage battery 8a, the second storage battery 8b, and the third storage battery 8c based on the calculation result, the power consumption of the load 3, and the generated power by the solar battery 4. Then, the HEMS 11 creates an operation plan based on the calculation result.

In step 5, the control device 10 receives the requested power P0 from the HEMS 11 and the processing proceeds to step 6. It should be noted that the requested power P0 is calculated by the HEMS 11 based on the chargeable and dischargeable power P1, P2, and P3 of the first storage battery 8a, the second storage battery 8b, and the third storage battery 8c, the power generation state of the solar battery 4, the state of the electric power system 2, the power consumption of the load 3, and the like, which are reported to the HEMS 11 by the control device 10, and the requested power P0 does not exceed the sum of the chargeable and dischargeable power P1, P2, and P3.

In step 6, the control device 10 determines the charge and discharge power for the first storage battery 8a, the second storage battery 8b, and the third storage battery 8c with respect to the requested power P0 received from the HEMS 11 and the processing proceeds to step 7. When the charge and discharge power is determined, the requested power P0 may be evenly divided simply or the chargeable and dischargeable power and the progress of degradation may be considered as described in the following examples.

Figure 10:
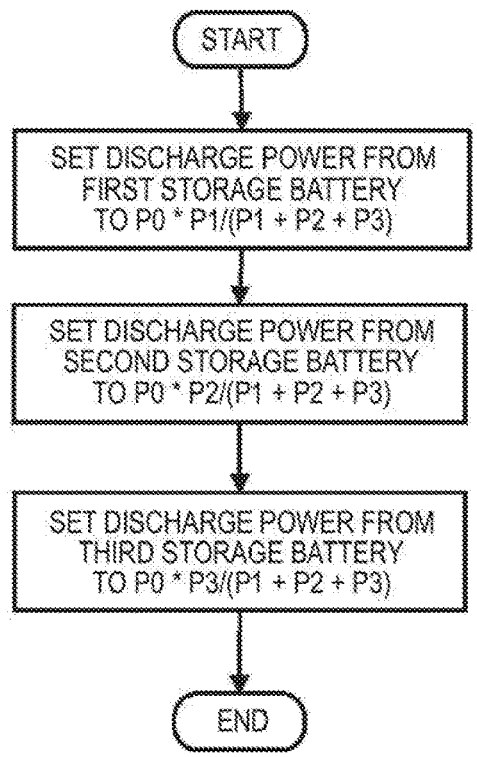
FIG. 10 is the first flowchart illustrating the discharge power determination procedure for the storage batteries according to embodiment 1 of the invention.

Example 1: When the Discharge Power is Determined Based on the Ratio of the Chargeable and Dischargeable Power With Respect to the Requested Discharge Power When the control device 10 receives the requested discharge power P0 from the HEMS 11, the control device 10 determines the discharge power from the first storage battery 8a, the second storage battery 8b, and the third storage battery 8c as described below based on the ratio of the chargeable and dischargeable power P1, P2, and P3 by following the flowchart in FIG. 10.

Discharge power from the first storage battery 8a:
$P0*P1/(P1+P2+P3)$

Discharge power from the second storage battery 8b:
P0*P2/(P1+P2+P3)

Discharge power from the third storage battery 8c:
P0*P3/(P1+P2+P3)    (1)

Figure 11:
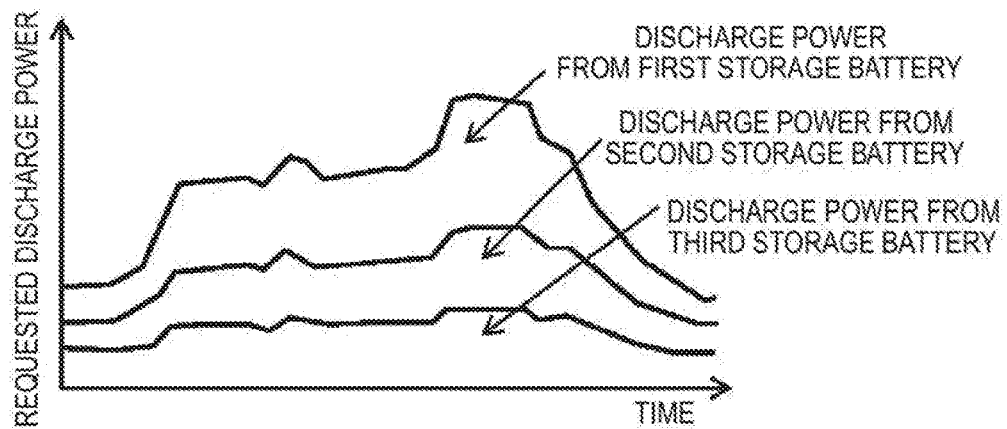
FIG. 11 is the first specific operational waveform diagram when discharge power is determined according to the discharge power determination procedure for the storage batteries according to embodiment 1 of the invention.

FIG. 11 illustrates the specific operational waveform diagram when the discharge power from the first storage battery 8a, the second storage battery 8b, and the third storage battery 8c is determined using expressions 1. However, it is assumed that the chargeable and dischargeable power P1, P2, and P3 meets the inequality P1>P2>P3.

According to FIG. 11, it can be seen that the discharge power is suppressed to be small for a storage battery having a small chargeable/dischargeable electric power, and the fluctuation of the discharge power is also small. Since the storage battery having been more degraded is subject to a larger use limitation in the invention, the chargeable and dischargeable power becomes smaller. Accordingly, the discharge power and fluctuations in the discharge power from the storage battery having been degraded can be reduced by determining the discharge power from the first storage battery 8a, the second storage battery 8b, and the third storage battery 8c as described above, thereby preventing the storage battery having been degraded from being further degraded. It should be noted that, when the calculation results of expressions 1 above exceed the values of P1, P2, and P3, the discharge power is determined so that the calculation results are equal to or less than the values of P1, P2, and P3 and the power that cannot be discharged is discharged from the dischargeable storage battery 8.

Figure 12:
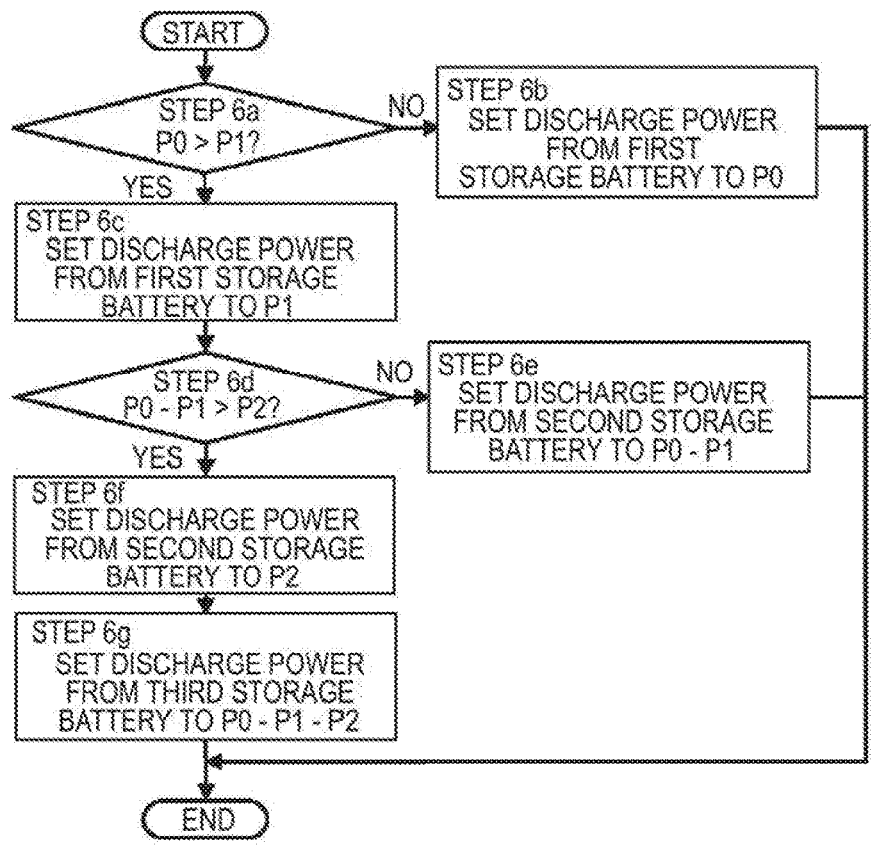
FIG. 12 is the second flowchart illustrating the discharge power determination procedure for the storage batteries according to embodiment 1 of the invention.
Figure 13:
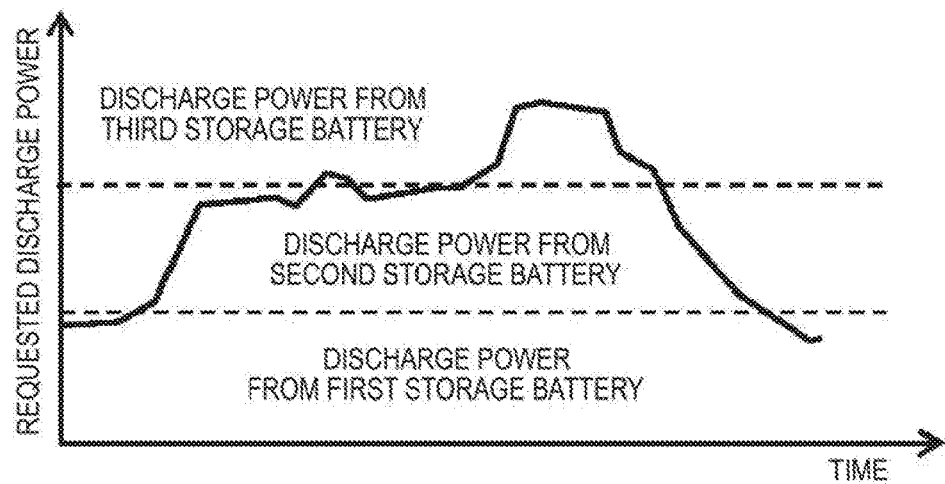
FIG. 13 is the second specific operational waveform diagram when discharge power is determined according to the discharge power determination procedure for the storage batteries according to embodiment 1 of the invention.

Example 2: when the Discharge Power is Determined so as to Reduce the Use Ratio and the Use Frequency of the Storage Battery Having been Degraded with Respect to the Requested Discharge Power When the control device 10 receives the requested discharge power P0 from the HEMS 11, the control device 10 determines the discharge power from the first storage battery 8a, the second storage battery 8b, and the third storage battery 8c so as to reduce the use frequency of the storage battery having been degraded by following the flowchart in FIG. 12. The flowchart will be described below on the assumption that the following inequality is met: progress of degradation of first storage battery 8a<progress of degradation of second storage battery 8b<progress of degradation of third storage battery 8c. In addition, FIG. 13 illustrates the specific operational waveform when the discharge power from the first storage battery 8a, the second storage battery 8b, and the third storage battery 8c is determined according to the procedure of the flowchart.

As illustrated in the flowchart in FIG. 12, in step 6a, the control device 10 compares the requested discharge power P0 with the chargeable and dischargeable power P1 of the first storage battery 8a having least degraded. The processing proceeds to step 6b when the chargeable and dischargeable power P1 is equal to or more than the requested discharge power P0 or the processing proceeds to step 6c when the chargeable and dischargeable power P1 is less than the requested discharge power P0.

In step 6b, since the chargeable and dischargeable power P1 is equal to or more than the requested discharge power P0, the control device 10 determines that the requested discharge power P0 can be covered only by the first storage battery 8a, sets the discharge power from the first storage battery 8a to P0 and the discharge power from the second storage battery 8b and the third storage battery 8c to 0, and ends the processing of the flowchart.

In step 6c, since the chargeable and dischargeable power P1 is less than the requested discharge power P0, the control device 10 sets the discharge power from the first storage battery 8a to P1 and the processing proceeds to step 6d. The reason why the discharge power from the first the storage battery 8a is set to P1 is that the use ratio of the storage battery having been more degraded is reduced by using the first storage battery 8a having least degraded at the maximum.

In step 6d, the control device 10 compares the difference P0−P1 between the requested discharge power P0 and the discharge power P1 from the first storage battery 8a with the chargeable and dischargeable power P2 of the second storage battery 8b having been second least degraded. The processing proceeds to step 6e when the chargeable and dischargeable power P2 is equal to or more than the difference P0−P1 or the processing proceeds to step 6f when the chargeable and dischargeable power P2 is less than the difference P0−P1.

In step 6e, since the chargeable and dischargeable power P2 is equal to or more than the difference P0−P1 between the requested discharge power P0 and the discharge power P1 from the first storage battery 8a, the control device 10 determines that the difference P0−P1 can be discharged in the second storage battery 8b, sets the discharge power from the second storage battery 8b to P0−P1 and the discharge power from the third storage battery 8c to 0, and ends the processing of the flowchart.

In step 6f, since the chargeable and dischargeable power P2 is less than the difference P0−P1 between the requested discharge power P0 and the discharge power P1 from the first storage battery 8a, the control device 10 sets the discharge power from the second storage battery 8b to P2 and the processing proceeds to step 6g. The reason why the discharge power from the second storage battery 8b is set to P2 is the same as the reason why the discharge power from the first storage battery 8a is set to P1 in step 6c and this is because the use ratio of the third storage battery 8c having been most degraded is reduced.

In step 6g, the control device 10 sets the discharge power from the third storage battery 8c to P0−P1−P2 and ends the processing of the flowchart.

Since the requested discharge power P0 from the HEMS 11 does not exceed the sum of the chargeable and dischargeable power P1, P2, and P3 of the first storage battery 8a, the second storage battery 8b, and the third storage battery 8c, the third storage battery 8c can discbarge the discharge power P0−P1−P2.

The control device 10 can suppress the use frequency of the storage battery having been much degraded to low as illustrated in FIG. 13 by determining the charge power from the first storage battery 8a, the second storage battery 8b, and the third storage battery 8c as described above. In addition, the control device 10 can also suppress the use ratio of the storage battery having been much degraded to low. Accordingly, the control device 10 can further suppress the degradation of the storage battery having been much degraded.

Figure 14:
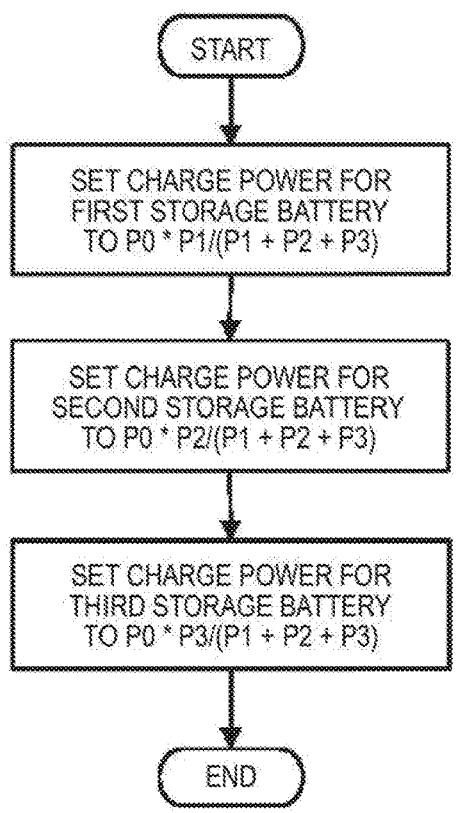
FIG. 14 is the first flowchart illustrating the charge power determination procedure for the storage batteries according to embodiment 1 of the invention.

Example 3: when the Charge Power is Determined Based on the Ratio of Chargeable and Dischargeable Power with Respect to the Requested Charge Power When the control device 10 receives the requested discharge power P0 from the HEMS 11, the control device 10 determines the charge power for the first storage battery 8a, the second storage battery 8b, and the third storage battery 8c based on the ratio of the chargeable and dischargeable power P1, P2, and P3 by following the flowchart in FIG. 14.

Charge power for the first storage battery 8a:
P0*P1/(P1+P2+P3)

Charge power for the second storage battery 8b:
P0*P2/(P1+P2+P3)

Charge power for the third storage battery 8c:
P0*P3/(P1+P2+P3)     (2)

Figure 15:
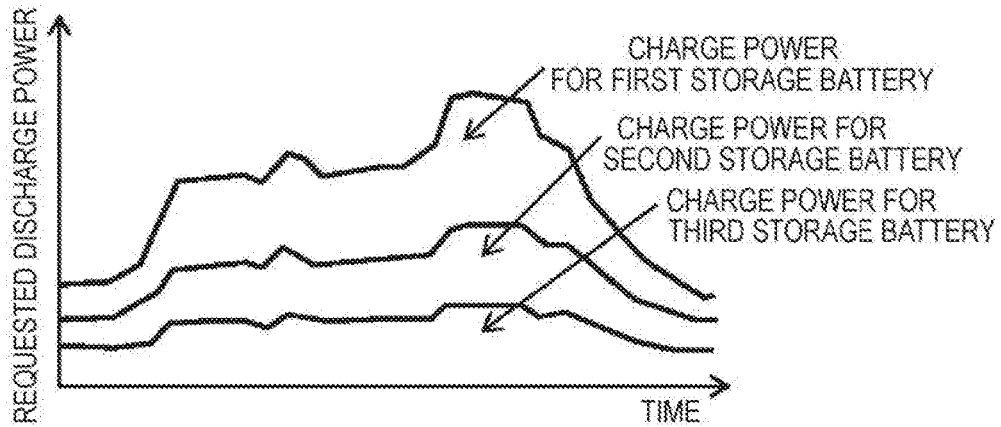
FIG. 15 is the first specific operational waveform diagram when charge power is determined according to the charge power determination procedure for the storage batteries according to embodiment 1 of the invention.

FIG. 15 illustrates the specific operational waveform diagram when the charge power for the first storage battery 8a, the second storage battery 8b, and the third storage battery 8c is determined using expression 2. However, it is assumed that the chargeable and dischargeable power P1, P2, and P3 meets the inequality P1>P2>P3. It can be seed from FIG. 15 that, as the chargeable and dischargeable power of the storage battery is smaller, the charge power for the storage battery is smaller and fluctuations in the discharge power are smaller. Since the storage battery having been more degraded is subject to a larger use limitation in the invention, the chargeable and dischargeable power becomes smaller. Accordingly, the charge power and fluctuations in the charge power for the storage battery having been degraded can be reduced by determining the charge power for the first storage battery 8a, the second storage battery 8b, and the third storage battery 8c as described above, thereby preventing the storage battery having been degraded from being further degraded.

Example 4: When the Discharge Power is Determined so as to Reduce Fluctuations in the Charge Power for the Storage Battery Having been Degraded with Respect to the Requested Charge Power When the control device 10 receives the requested discharge power P0 from the HEMS 11, the control device 10 determines the charge power for the first storage battery 8a, the second storage battery 8b, and the third storage battery 8c so as to reduce fluctuations in the charge power for the storage battery having been degraded by following the flowchart in FIG. 16. The flowchart will be described below on the assumption that the following inequality is met: progress of degradation of first storage battery 8a<progress of degradation of second storage battery 8b<progress of degradation of third storage battery 8c. In addition, FIG. 17 illustrates the specific operational waveform diagram when the charge power for the first storage battery 8a, the second storage battery 8b, and the third storage battery 8c is determined according to the procedure of the flowchart.

Figure 16:
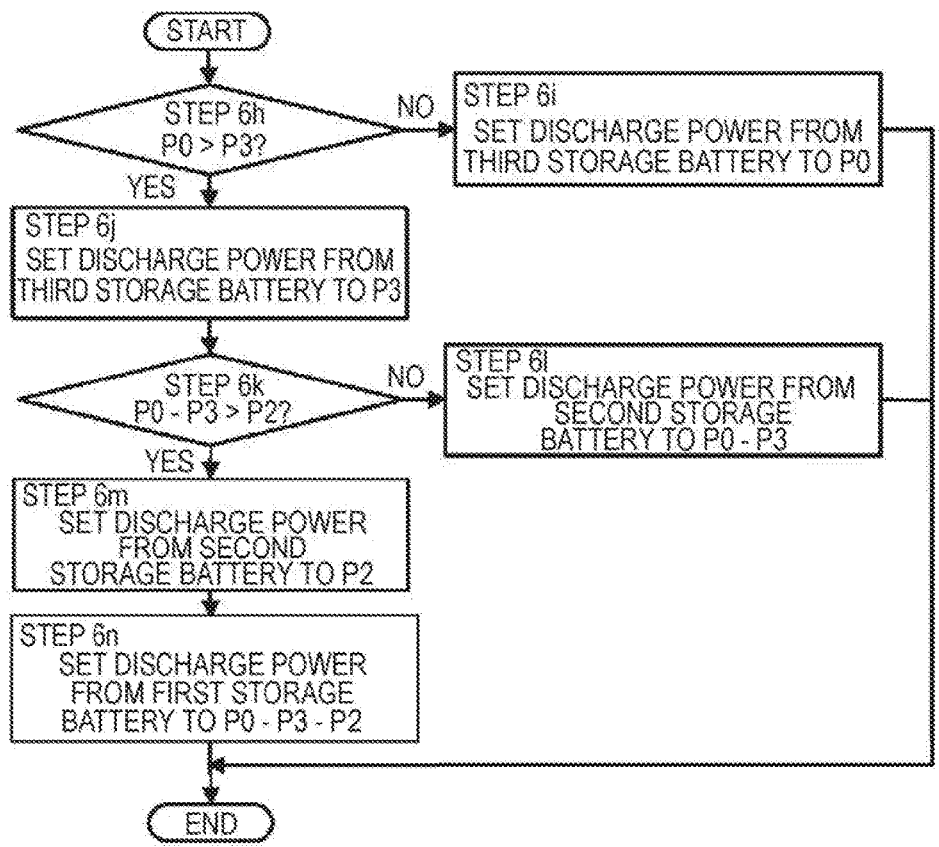
FIG. 16 is the second flowchart illustrating the charge power determination procedure for the storage batteries according to embodiment 1 of the invention.
Figure 17:
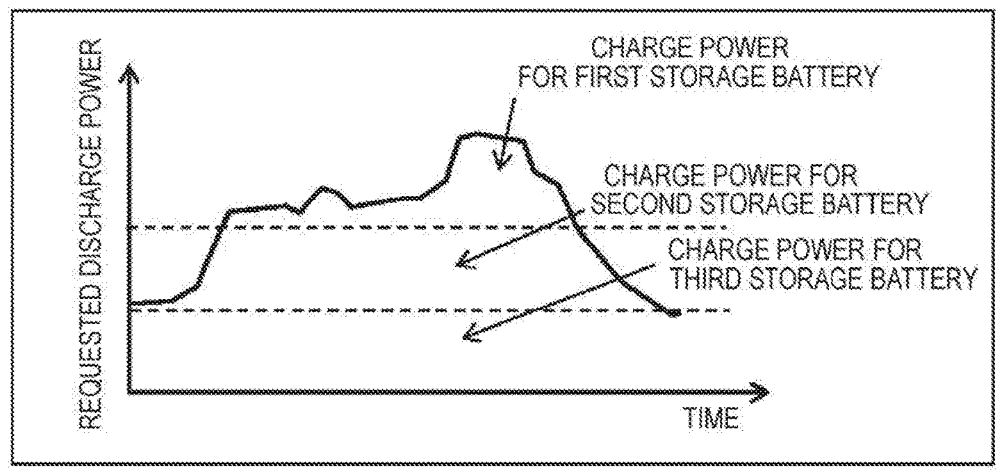
FIG. 17 is the second specific operational waveform diagram when charge power is determined according to the charge power determination procedure for the storage batteries according to embodiment 1 of the invention.

As illustrated in the flowchart in FIG. 16, in step 6h, the control device 10 compares the requested charge power P0 with the chargeable and dischargeable power P3 of the third storage battery 8c having been most degraded. The processing proceeds to step 6i when the chargeable and dischargeable power P3 is equal to or more than the requested charge power P0 or the processing proceeds to step 6j when the chargeable and dischargeable power P3 is less than the requested charge power P0.

In step 6i, since the chargeable and dischargeable power P3 is equal to or more than the requested charge power P0, the control device 10 determines that the requested charge power P0 can be covered only by the third storage battery 8c, sets the charge power for the third storage battery 8c to P0 and the charge power for the first storage battery 8a and the second storage battery 8b to 0, and ends the processing of the flowchart.

In step 6j, since the chargeable and dischargeable power P3 is less than the requested charge power P0, the control device 10 sets the charge power for the third storage battery 8c to P3 and the processing proceeds to step 6k. The reason why the charge power for the third storage battery 8c is set to P3 is that the third storage battery 8c is not charged any more even when the requested charge power P0 increases suddenly because the third storage battery 8c having been most degraded is used at the maximum, thereby enabling suppression of fluctuations in the charge power.

In step 6k, the control device 10 compares the difference P0−P3 between the requested charge power P0 and the charge the power P3 for the third storage battery 8c with the chargeable and dischargeable power P2 for the second storage battery 8b having been second most degraded. The processing proceeds to step 6l when the chargeable and dischargeable power P2 is equal to or more than the difference P0−P1 or the processing proceeds to step 6m when the chargeable and dischargeable power P2 is less than the difference P0−P1.

In step 6l, since the chargeable and dischargeable power P2 is equal to or more than the difference P0−P3 between the requested charge power P0 and the charge power P3 for the third storage battery 8c, the control device 10 determines that the difference P0−P3 can be charged by the second storage battery 8b and sets the charge power for the second storage battery 8b to P0−P3 and the charge power for the first storage battery 8a to 0 and ends the processing of the flowchart.

In step 6m, since the chargeable and dischargeable power P2 is less than the difference P0−P3 between the requested discharge power P0 and the charge power P3 for the third storage battery 8c, the control device 10 sets the charge power for the second storage battery 8b to P2 and the processing proceeds to step 6n. The reason why the charge power for the second storage battery 8b is set to P2 is the same as the reason why the charge power for the third storage battery 8c is set to P3 in step 6j. That is, fluctuations in the charge power need to be suppressed even when the requested charge power P0 increases suddenly.

In step 6n, the control device 10 sets the charge power for the first storage battery 8a to P0−P3−P3 and ends the processing of the flowchart. Since the requested charge power P0 from the HEMS 11 does not exceed the sum of the chargeable and dischargeable power P1, P2, and P3 of the first storage battery 8a, the second storage battery 8b, and the third storage battery 8c, the first storage battery 8a can charge the charge power P0−P3−P2.

Since the control device 10 determines the charge power of the first storage battery 8a, the second storage battery 8b, and the third storage battery 8c as described above, fluctuations in the charge power of the storage battery having been much degraded can be suppressed as illustrated in FIG. 17. In addition, since the capacities of the first storage battery 8a, the second storage battery 8b, and the third storage battery 8c are generally large, a voltage does not rise sharply in a short time. Accordingly, the storage battery having been much degraded is charged at approximately a constant current, thereby further suppressing degradation.

As described above, by determining the charge and discharge power of the first storage battery 8a, the second storage battery 8b, and the third storage battery 8c with respect to the requested power P0 in consideration of the chargeable and dischargeable power and the degree of progress of degradation, it is possible to further suppress the progress of degradation of the storage battery having been much degraded. Accordingly, even when the progress of degradation deviates between the first storage battery 8a, the second storage battery 8b, and the third storage battery 8c due to variations between the storage batteries, differences in the use environment, and the like, the progress of degradation between the storage batteries 8 can be matched by suppressing the progress of degradation of the storage battery 8 having been more degraded by applying a limitation (using a strict limitation table) to the use condition of the storage battery 8 having been more degraded as described above.

Figure 7:
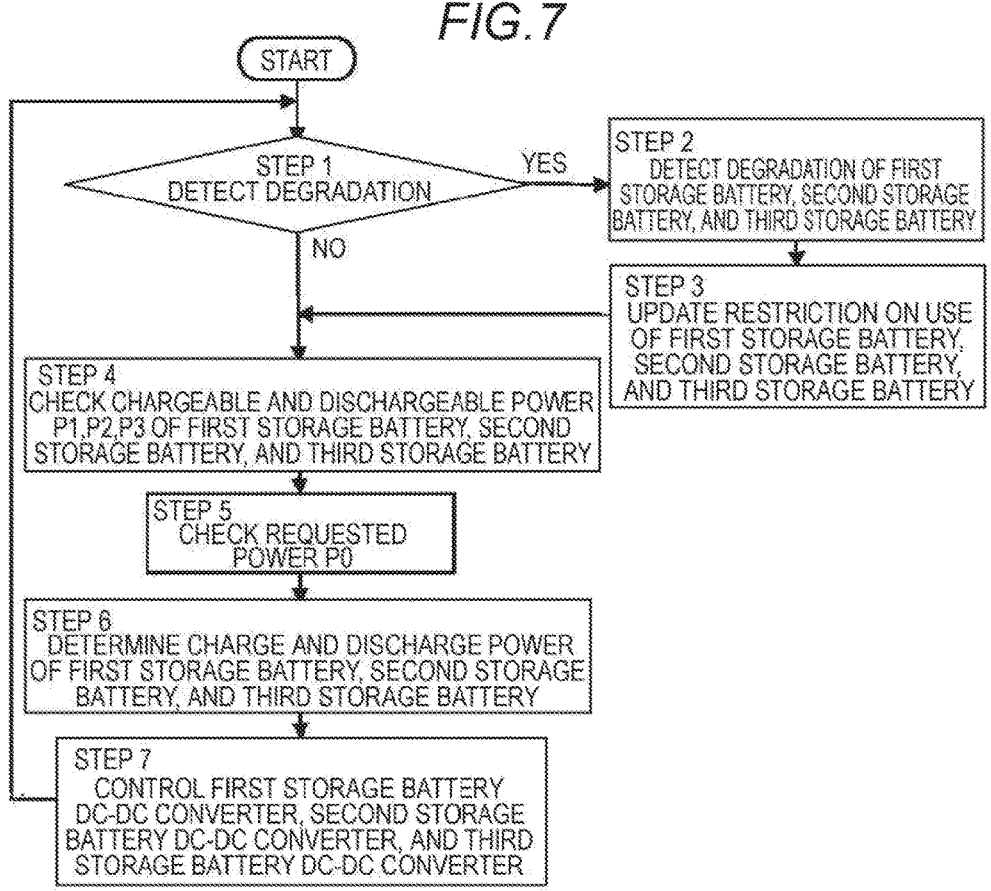
FIG. 7 is a flowchart illustrating the operational procedure for the storage batteries according to embodiment 1 of the invention.

After these steps are completed, the processing proceeds to step 7 as illustrated in the drawing FIG. 7. In step 7, the control device 10 sends control commands to the first storage battery DC-DC converter 9a, the second storage battery DC-DC converter 9b, and the third storage battery DC-DC converter 9c to make control so that the charge and discharge power of the first storage battery 8a, the second storage battery 8b, and the third storage battery 8c matches the charge and discharge power determined in step 6. It should be noted that the control device 10 may make control in consideration of the loss of the first storage battery DC-DC converter 9a, the second storage battery DC-DC converter 9b, and the third storage battery DC-DC converter 9c.

As described above, in embodiment 1, limitations on the maximum charge and discharge current, the usable voltage range, and the usable temperature range determined according to the progress of degradation are controlled according to the progress of degradation in the first storage battery 8a, the second storage battery 8b, and the third storage battery 8c during normal operation. Accordingly, since the storage battery having been more degraded is given a severe use condition by the limitation table, high degradation suppression effects can be obtained. Accordingly, the progress of degradation of the first storage battery 8a, the second storage battery 8b, and the third storage battery 8c can be substantially matched.

Next, the operation in the storage battery 8 and the storage battery DC-DC converter 9 during a power interruption will be described.

As described above, during a power interruption, the control device 10 obtains the measurement value from the voltmeter (not illustrated) for measuring the bus line voltage and controls the output voltage of the storage battery DC-DC converter 9 so that the measurement value becomes the preset first control target voltage. This means that the control device 10 performs control so that the output voltages of the first storage battery DC-DC converter 9a, the second storage battery DC-DC converter 9b, and the third storage battery DC-DC converter 9c become the first control target voltage and the control device 10 drives and controls the first storage battery DC-DC converter 9a, the second storage battery DC-DC converter 9b, and the third storage battery DC-DC converter 9c via voltage control.

When the suppliable power P1, P2, and P3 of the first storage battery 8a, the second storage battery 8b, and the third storage battery 8c is sufficient at this time, the power supplied from the first storage battery 8a, the power supplied from the second storage battery 8b, and the power supplied from the third storage battery 8c should be matched ideally. However, the remaining amounts and limitations of the maximum charge and discharge current, the usable voltage range, and the usable temperature range determined according to the progress of degradation of the first storage battery 8a, the second storage battery 8b, and the third storage battery 8c may cause differences between the suppliable power P1, P2, and P3 of the first storage battery 8a, the second storage battery 8b, and the third storage battery 8c and the suppliable power of any of these storage batteries may become insufficient.

For example, when the suppliable power P1 of the first storage battery 8a is insufficient, the output voltage of the first storage battery DC-DC converter 9a connected to the first storage battery 8a is reduced to the value corresponding to the suppliable power P1 of the first storage battery 8a. However, the power that cannot be covered by the first storage battery 8a is automatically covered by the other batteries, which are the second storage battery 8b and the third storage battery 8c, the bus line voltage is kept at the first control target voltage and power is supplied to the load 3 normally.

As described above, since the first storage battery 8a, the second storage battery 8b, and the third storage battery 8c are used within the limitations of the maximum charge and discharge current, the usable voltage range, and the usable temperature range determined depending on the progress of degradation even during a power interruption, the storage battery having been more degraded can obtain higher degradation suppression effects. Accordingly, the progress of degradation of the first storage battery 8a, the second storage battery 8b, and the third storage battery 8c can be substantially matched.

Although a limitation table is used to control the progress of degradation of the storage battery even in independent operation in embodiment 1, the invention is not limited to the embodiment and independent operation due to a power interruption is hardly performed in the power demand in Japan. Accordingly, even when control is made according to the specification specific to the storage battery without using a limitation table for degradation suppression during a power interruption, the degradation of the storage battery does not quickly proceed as long as the period is short.

As described above, the control device 10 controls the first storage battery DC-DC converter 9a, the second storage battery DC-DC converter 9b, and the third storage battery DC-DC converter 9c during normal operation and a power interruption, so as to perform charge and discharge of the first storage battery 8a, the second storage battery 8b and the third storage battery 8c within limitation ranges of the maximum charge and discharge current, the usable voltage range, and the usable temperature range determined according to the progress of degradation of the first Storage battery 8a, the second storage battery 8b, and the third storage battery 8c, so the storage battery having been more degraded can obtain higher degradation suppression effects.

Figure 18A:
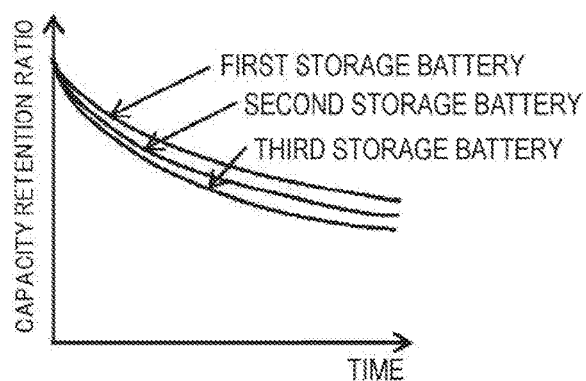
FIG. 18A, FIG. 18B illustrates the first inventive effect according to embodiment 1 of the invention.
Figure 18B:
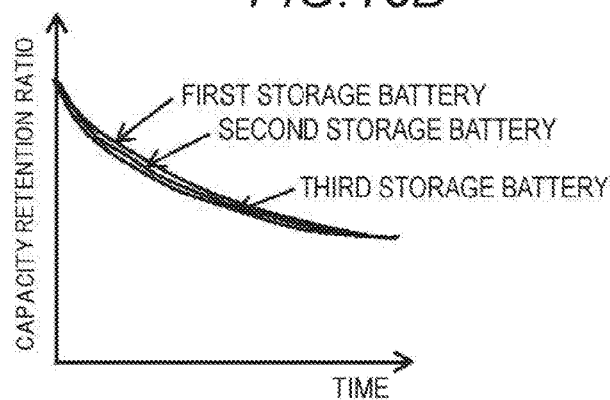
Figure 19A:
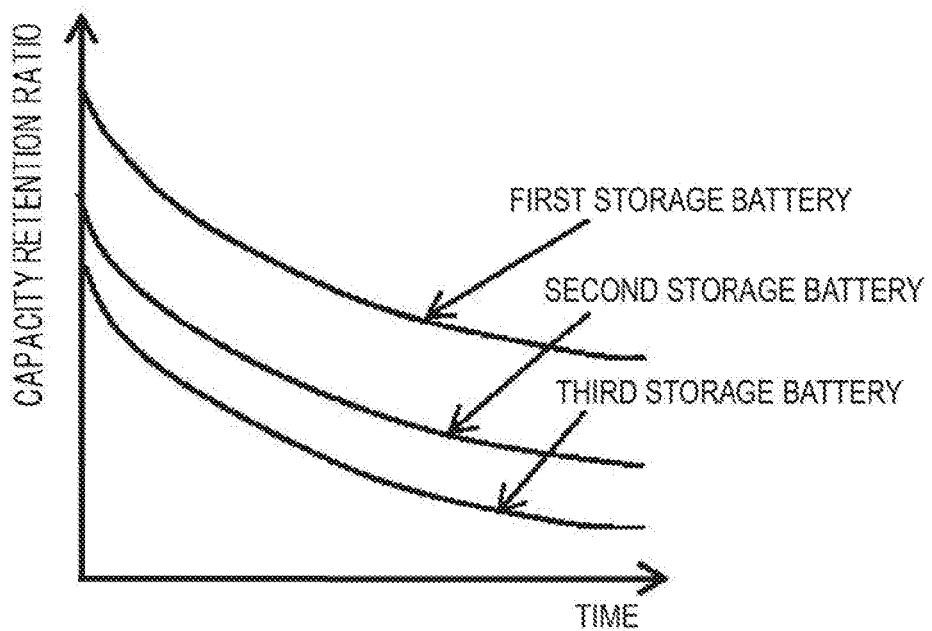
FIG. 19A, FIG. 19B illustrates the second inventive effect according to embodiment 1 of the invention.
Figure 19B:
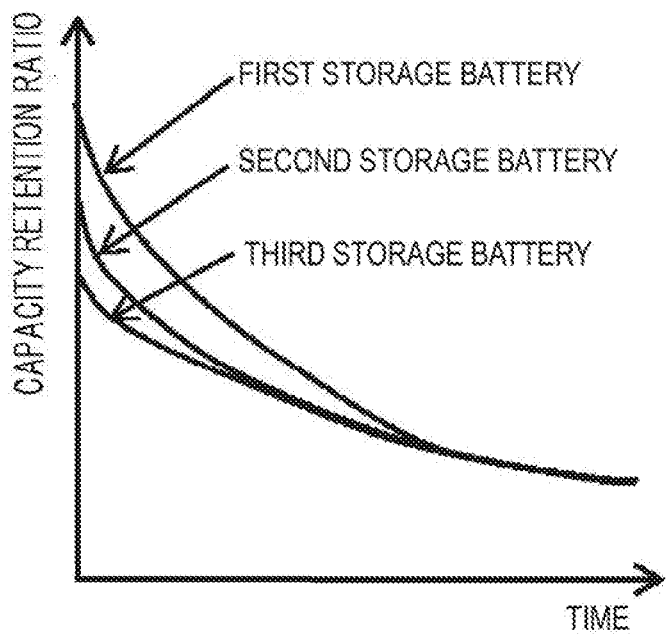

Accordingly, when the replacement times differ due to variations in the characteristics of the storage batteries even if they are used similarly as illustrated in FIG. 18A, since the progress of degradation can be made closer so that they can be replaced at the same time as illustrated in FIG. 18B, the maintainability is improved. In addition, even when, for example, used storage batteries having been degraded differently are used as illustrated in FIG. 19A and the replacement times differ originally even if they are used similarly, since the progress of degradation can be substantially matched so that they can be replaced at the same time as illustrated in FIG. 19B, the maintainability is improved. In addition, even when, for example, used storage batteries having been degraded differently are used as illustrated in FIG. 19A and the replacement times differ originally even if they are used similarly, the progress of degradation can be made closer as illustrated in FIG. 19B.

Although the solar battery DC-DC converter 5 having the solar battery 4 as a power supply is connected to the DC bus line 6 in embodiment 1, the invention is not necessarily limited to the embodiment. For example, wind power generation, hydroelectric power generation, or the like may be used. Although MPPT control and voltage control are used in the case of the solar battery 4, power control for obtaining the maximum power and voltage control for controlling output voltage may be used also in the case of wind power generation, hydroelectric power generation, or the like. In addition, only a plurality of storage energy devices may be connected to the DC bus line 6 without having an energy generating device.

In addition, although DC power supplied from the solar battery 4, the first storage battery 8*a*, the second storage battery 8*b*, and the third storage battery 8*c* is once converted to AC power by the DC-AC converter 7 and then the AC power is supplied to the load 3 in embodiment 1, the invention is not limited to the embodiment. For example, DC power may be directly supplied to the load 3 through the DC bus line 6 or DC power may be DC-to-DC converted and then supplied to the load 3, which is the so-called DC-power-enabled load 3.

In addition, although the AC side of the DC-AC converter 7 is connected to the electric power system 2 and the load 3 in embodiment 1, the invention is not necessarily limited to the embodiment. For example, the AC side of the DC-AC converter 7 may be connected to the motor so that the AC side of the DC-AC converter 7 is used as the power supply system of an electric vehicle. At this time, the function of the HEMS 11 may be covered by the ECU (Electronic Control Unit) of the electric vehicle or may be covered by the control device 10.

Finally, although the control device 10 controls the individual converters in embodiment 1, the invention is not limited to the embodiment. For example, the control device 10 may determine the charge and discharge power or the target voltage values of the individual converters and control circuits built into the individual converters or special control circuits may make control so that the outputs of the individual converters become the target values.

In addition, although the HEMS 11 detects degradation in embodiment 1, degradation may be detected by collecting data necessary for detecting degradation using the degradation detection device 12 and analysing the data in the control device 10, the degradation detection device 12, or a cloud server (not illustrated). In addition, it will be appreciated that the degradation of the storage battery 8 may be estimated in the degradation detection device 12. In addition, part of the calculation of the estimation of degradation may be performed by the cloud server and the final estimation may be performed by the HEMS 11 or the degradation detection device 12.

In addition, although the information of the chargeable and dischargeable power of the status information of the storage batteries 8 is input from the control device 10 to the HEMS 11 and the charge and discharge power of each of the storage batteries 8 is determined by the HEMS 11 in embodiment 1, the same effect can be also obtained by determining the charge and discharge power of each of the storage batteries 8 by inputting the information of the power amount from the control device 10 to the HEMS 11. The power amount is obtained by integrating power with respect to the time axis. For example, the chargeable power amount represents the amount of power that can be charged until the storage battery reaches the charge termination voltage from the current state and the dischargeable power amount represents the amount of power that can be discharged until the storage battery reaches the discharge termination voltage from the current state.

In embodiment 1, the usable voltage range of the storage battery 8 is limited depending on the progress of degradation of the storage battery 8, as illustrated in FIG. 8. However, the invention is not limited to the embodiment and it will be appreciated that the usable voltage range may be further controlled by the storage battery temperature in addition to the progress of degradation. As described above, when the storage battery 8 having nearly fully charged is exposed to high temperature, degradation proceeds as in embodiment 1. Accordingly, particularly at high temperature, it will be appreciated that storage deterioration can be prevented by suppressing the charge termination voltage.

In addition, when the storage battery 8 is charged in a time period in which midnight power bills are low and discharged in a time period in which daytime power bills are high, it will be appreciated that air temperature forecast information may be acquired and, based on the acquired temperature forecast information, the termination voltage during charge at midnight may be determined.

In addition, in embodiment 1, the maximum charge and discharge current value of the storage battery 8 is controlled according to the progress of degradation of the storage battery 8, as illustrated in FIG. 9. However, the invention is not limited to this embodiment and it will be appreciated that the maximum charge and discharge current value may be further controlled based on the storage battery temperature or/and the storage battery voltage in addition to the progress of degradation. As described above, as in embodiment 1, the progress of degradation of the storage battery depends on the temperature of the storage battery. Accordingly, it will be appreciated that the progress of degradation of the storage battery can be suppressed by reducing the maximum charge and discharge current to the storage battery voltage (SoC of the storage battery) at high temperature or low temperature at which storage battery is particularly degraded or particularly during charge.

In addition, although the maximum charge and discharge current value of the storage battery 8 has been described as illustrated in FIG. 9 in embodiment 1, the invention is not limited to the embodiment and the control method for charge is different from the control method for discharge particularly when a lithium ion battery is used, as described above. Specifically, when the SoC (or storage battery voltage) exceeds a predetermined value during charge, constant current control switches to constant voltage control. Accordingly, it will be appreciated that the limitation table for charge may be different from the limitation table for discharge.

In addition, although limitation tables are used to limit the maximum charge and discharge current, the usable voltage range, and the usable temperature range in embodiment 1, the invention is not limited to the embodiment and it will be appreciated that mathematical expressions or predetermined approximate curves may be used.

In addition, the estimating method for storage battery degradation is not limited to the history database construction method and it will be appreciated that another method such as the DC resistance measurement method, the AC impedance measurement method, the discharge curve analysis method, or the charge curve analysis method may be used.

In addition, although the temperature detection device 15 detects the temperature of the storage battery 8 in embodiment 1, it will be appreciated that the temperature of the storage battery 8 may be estimated based on the air temperature or the charge and discharge current other than the method for directly measuring the temperature of the storage battery 8 using thermocouples or the like.

Although a lithium-ion battery is used as an example of the storage battery 8 in embodiment 1, the invention is not limited to the embodiment and it will be appreciated that another battery such as, for example, a nickel metal-hydride battery or a lead-battery may foe used. Since electric energy is charged or discharged by a chemical reaction particularly in the case of a lead-storage battery, the effect of the temperature of the storage battery is very large. Accordingly, it will be appreciated that the progress of degradation of the storage battery is controlled by controlling at least the maximum charge and discharge current amount, the usable voltage range, or the maximum charge and discharge current amount based on the voltage of the storage battery, based on the temperature of the storage battery.

Figure 20:
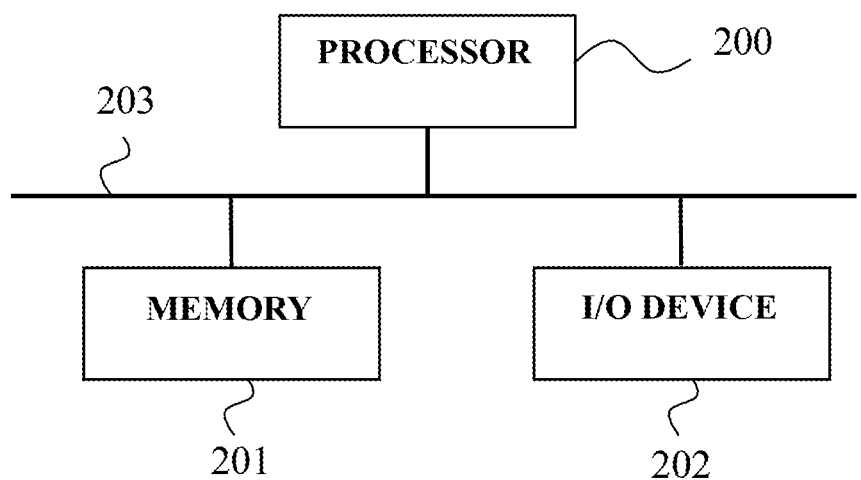
FIG. 20 is a hardware configuration diagram for realizing a block diagram according to an embodiment of the present invention.

Each of the functional blocks shown in the embodiments is realized by the control device 10. The hardware of the control device 10 is shown in FIG. 20. That is, a processor 200, a memory 201 for storing programs and data, and an input/output device 202 such as a sensor are connected via a data bus 203, and data processing and data transmission are performed under the control of the processor 200.

It should be noted that the embodiment of the invention may be modified or omitted as appropriate within the scope of the invention. In addition, each of the devices used in the descriptions of the embodiment is not limited to a single unit and may be practiced as means configured by combining a plurality of functional devices so as to have the same function.

The invention claimed is:

1. A power conversion system comprising:
   a plurality of storage battery power converters provided for each of a plurality of storage batteries used as input power supplies, the storage battery power converters operating the storage batteries in parallel;
   a degradation information acquisition device that acquires degradation information of the storage batteries;
   a temperature information acquisition device that detects temperature information of the storage batteries; and
   a control device that controls the storage battery power converters based on the degradation information of the storage batteries by the degradation information acquisition device and the temperature information of the storage batteries by the temperature information acquisition device,
   wherein, based on progress of degradation of the storage batteries acquired by the degradation information acquisition device, the control device controls charge and discharge of the storage batteries by performing:
      an operation for making a usable temperature range of a storage battery of the storage batteries that has been more degraded equal to or smaller than the usable temperature range of a storage battery of the storage batteries that has been less degraded, and
      at least one of an operation for making a maximum charge and discharge current with respect to a storage battery temperature of the storage battery having been more degraded equal to or smaller than the maximum charge and discharge current of the storage battery having been less degraded and an operation for making a usable voltage range with respect to the storage battery temperature of the storage battery having been more degraded equal to or smaller than the usable voltage range of the storage battery having been less degraded.

2. The power conversion system according to claim 1, wherein the control device controls the charge and discharge of the plurality of storage batteries so that degradation states of the storage batteries are able to be matched.

3. The power conversion system according to claim 1, wherein the temperature information of the storage batteries is cell temperatures of the storage batteries,
   a maximum charge and discharge current value is based on 1 C that is the amount of current for fully charging the storage batteries for one hour, and
   a charge termination voltage or a discharge termination voltage is a voltage determined by a charge power ratio.

4. The power conversion system according to claim 1, wherein a usable range of the storage batteries is a temperature range in which a charge current does not become zero during charge or a temperature range in which a discharge current does not become zero during discharge.

5. The power conversion system according to claim 1, further comprising:
   operation plan creation means that determines charge and discharge power of the storage batteries based on the degradation information of the storage batteries and the temperature information of the storage batteries,
   wherein the control device controls charge and discharge of the storage batteries based on an operation plan from the operation plan creation means.

6. The power conversion system according to claim 1, wherein the degradation information acquisition device and the temperature information acquisition device include degradation estimation means for estimating progress of degradation of the storage batteries, voltage detection means for detecting voltages of the storage batteries, current detection means for detecting charge and discharge currents of the storage batteries, temperature measurement means for measuring temperatures of the storage batteries, and stored power measurement means for measuring stored power amounts of the storage batteries,
   store, in a database, various types of measurement results detected at predetermined intervals for a predetermined period by the voltage detection means, the current detection means, the temperature measurement means, and the stored power measurement means,
   estimate the progress of degradation of the storage batteries based on data stored in the database using the degradation estimation means, and
   control charge and discharge of the storage batteries using the control device.

7. The power conversion system according to claim 6, further comprising:
   storage battery capacity measurement means for making control so that the storage batteries having been fully discharged are fully charged and measuring the battery capacities of the storage batteries,
   wherein the degradation estimation means corrects the result of the estimated progress of degradation of the storage batteries based on the battery capacities of the storage batteries measured by the storage battery capacity measurement means.

8. The power conversion system according to claim 1,
wherein each of the storage batteries has a limitation table for limiting at least one of the maximum charge and discharge current, the usable voltage range, and the usable temperature range when the storage batteries are controlled by the control device based on the progress of degradation of the storage batteries acquired by the degradation information acquisition device, and charge and discharge of each of the storage batteries are controlled based on the limitation table.

9. The power conversion system according to claim 8, further comprising:

communication means for communicating with an outside, wherein the limitation table prepared for each of the storage batteries is rewritten via the communication means from the outside.

10. The power conversion system according to claim 5,
wherein the operation plan creation means determines charge and discharge power of the storage batteries based on chargeable and dischargeable power input from the control device.

11. The power conversion system according to claim 5,
wherein the operation plan creation means determines charge and discharge power of the storage batteries based on the amount of chargeable and dischargeable power input from the control device.

12. The power conversion system according to claim 5,
wherein, when determining the discharge power of the storage batteries, the operation plan creation means assigns discharge power to one of the storage batteries that has been least degraded and, when shortage occurs, sequentially adds the storage batteries to be discharged in the ascending order of the progress of degradation.

13. The power conversion system according to claim 5,
wherein, when determining the charge power of the storage batteries, the operation plan creation means assigns charge power to one of the storage batteries that has been most degraded and, when shortage occurs, sequentially adds the storage batteries to be charged in the descending order of the progress of degradation.

* * * * *